(12) United States Patent
Yamasaki

(10) Patent No.: US 7,773,523 B2
(45) Date of Patent: Aug. 10, 2010

(54) NETWORK-QUALITY DETERMINING METHOD AND APPARATUS FOR USE THEREWITH

(75) Inventor: Yasuhiro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 667 days.

(21) Appl. No.: 11/210,727

(22) Filed: Aug. 25, 2005

(65) Prior Publication Data

US 2006/0045017 A1  Mar. 2, 2006

(30) Foreign Application Priority Data

Aug. 26, 2004  (JP)  ............................... 2004-246949

(51) Int. Cl.
  *H04L 12/26* (2006.01)
(52) U.S. Cl. ...................... 370/236; 370/230
(58) Field of Classification Search ................ 370/349, 370/394, 474, 252, 235, 230, 332, 412, 328, 370/395.42, 236; 455/466; 714/751; 709/223, 709/227
See application file for complete search history.

(56) References Cited

U.S. PATENT DOCUMENTS

| | | | | |
|---|---|---|---|---|
| 6,216,008 B1 * | 4/2001 | Lee | ............................. | 455/466 |
| 6,357,028 B1 * | 3/2002 | Zhu | ............................. | 714/751 |
| 7,082,467 B2 * | 7/2006 | Border et al. | ............... | 709/227 |
| 7,116,684 B2 * | 10/2006 | Imai et al. | .................... | 370/474 |
| 2002/0021700 A1 * | 2/2002 | Hata et al. | ............. | 370/395.42 |
| 2002/0071421 A1 * | 6/2002 | Chiu et al. | ................... | 370/349 |
| 2002/0120727 A1 * | 8/2002 | Curley et al. | ................ | 709/223 |
| 2003/0072266 A1 * | 4/2003 | Uesugi et al. | ............... | 370/236 |
| 2003/0081560 A1 * | 5/2003 | Honda | ......................... | 370/252 |
| 2004/0190537 A1 * | 9/2004 | Ferguson et al. | ............ | 370/412 |
| 2006/0023720 A1 * | 2/2006 | Ido et al. | ..................... | 370/394 |
| 2006/0203760 A1 * | 9/2006 | Fukui et al. | ................. | 370/328 |
| 2007/0115814 A1 * | 5/2007 | Gerla et al. | ................. | 370/230 |

FOREIGN PATENT DOCUMENTS

| | | |
|---|---|---|
| EP | 1 206 062 A2 | 5/2002 |
| JP | 2001-094573 A | 4/2001 |
| JP | 2002-152308 A | 5/2002 |

OTHER PUBLICATIONS

M. Kamiya, et al.; "Application Level Quality Estimation based on Multi-Layer protocol Measurement and Analysis"; Technical Report of IEICE, NS2003-162 CQ2003-79 TM 2003-40 (Nov. 2003).

* cited by examiner

*Primary Examiner*—Kwang B Yao
*Assistant Examiner*—Syed Bokhari
(74) *Attorney, Agent, or Firm*—Sughrue Mion, PLLC

(57) ABSTRACT

A data receiving portion receives data from a network. A filtering portion classifies the data received at the data receiving portion by flow. A condition monitoring portion monitors, for each flow, ACK-number information and SN-number information of the received data. A quality-determining portion determines whether or not a packet loss has occurred and the position of occurrences of packet losses, on the basis of information from the condition monitoring portion.

21 Claims, 20 Drawing Sheets

NETWORK-QUALITY DETERMINING METHOD AND APPARATUS FOR USE THEREWITH

BACKGROUND OF THE INVENTION

1. Field of the Invention

The present invention relates to methods for determining the quality of a network and an apparatus for use therewith.

2. Description of the Related Art

The present invention relates to an apparatus and methods for determining the quality of a network. In this specification, "the quality of a network" means the quality of data input to the measuring apparatus for determining the network quality, namely the quality of data passing through branch devices on the network. The quality of data means, for example, the throughput, the goodput, packet losses, response times, transaction-duration time, the positions of the occurrences of packet losses, etc.

Hereinafter, for easier understanding, network-quality determining techniques will be described by exemplifying TCP (Transmission Control Protocol).

There are some techniques known as techniques for determining the quality of TCP communications. For example, these techniques are described in JP-A No. 2001-94573. (Document 1) and a paper entitled "Application Level Quality Estimation based on Multi-Layer protocol Measurement and Analysis" i by M. kamiya et al., in Technical Report of IEICE, NS2003-162 CQ2003-79 TM 2003-40 (2003-11) (Document 2).

First, with reference to FIG. 1 and FIG. 2, there will be described the technique for determining the throughput, the goodput and packet losses, described in Document 1.

FIG. 1 is a view illustrating an aspect of the application of the techniques described in Documents 1 and 2, and FIG. 2 is a flow chart for explaining the operation of the technique described in Document 1. The technique described in Document 1 utilizes the following mechanism. Namely, in general, when the serial number (SN) of TCP is monotonously increased, there has been no data loss during communications and, only when a data loss is detected and thus a retransmission process is executed, the SN is decreased.

As illustrated in FIG. 1, when the quality of data communications between a communication terminal 2 and a communication terminal 3 are determined, a branch device 4 and a branch device 5 are installed on the communication link. These branch devices 4, 5 are connected to a measuring apparatus 1 for determining the network quality. The measuring apparatus 1 captures communication data to be measured through the branch devices 4, 5. By capturing data, the measuring apparatus 1 starts determination of the quality.

As illustrated in FIG. 2, the measuring apparatus 1 captures packets and classifies the captured packets to flows, wherein each flow has the same transmission/reception IP address and the same TCP port number (step A1). Then, steps A-2 to A-6 are executed for each flow.

The measuring apparatus 1 determines the amount of captured data, for each flow. The measuring apparatus 1 adds the amount of the newly captured data (=IP packet length) to the amount of data which has been passed though the apparatus 1 to determine the cumulative amount of data which has passed therethrough, for each data flow (step A-2).

Then, the measuring apparatus 1 reads the sequence number (hereinafter, referred to as "SN") existing in the TCP protocol header of the captured data. It is assumed that the read value is "X" (step A-3).

Subsequently, the measuring apparatus 1 makes a comparison between the maximum value (which is referred to as Y) out of SNs captured in the past at the same flow and the value X read at the step A-3 (step A-4).

If the comparison at the step A-4 reveals that X is greater than Y, the SN of the current captured data is greatest in the SNs which have been read for the same flow, and therefore the measuring apparatus substitutes the current X for Y and ends the process (step A-5). Then, when next data is inputted, the measuring apparatus re-starts the process at the step A-1.

If the comparison at the step A-4 reveals that X is not greater than Y, the measuring apparatus increments the number of packet losses by one. Further, the measuring apparatus adds the amount of current captured data (=IP packet length) to the amount of packet losses (step A6).

The accumulated packet size determined at the step A-2 at the end of communication is the amount of data received by the measuring apparatus. By converting this value into a value per unit time, "the throughput" can be obtained. Further, the number of packet losses and the amount of packet losses, which are counted at the step A6, indicate the quality relating to "packet losses". Further, the amount of normally-communicated data minus the amount of packet losses indicates the amount of data received by the communication partner. The amount of data received by the communication partner per unit time indicates the goodput.

Next, with reference to FIG. 3 to FIG. 8, the technique described in Document 2 will be described.

Document 2 describes a technique for detecting the occurrences of packet losses in the TCP three-way hand shake (data-communication establishing process) and identifying the positions of the occurrences of packet losses.

When no packet loss has occurred during TCP data communication establishing process, data at the same connection has a signal flow (CASE 0) as illustrated in FIG. 3. In this CASE 0, the measuring apparatus 1 receives packets in the order of "SYN (Synchronous)", "SYN+ACK (Acknowledgement)", "ACK", "GET" and "RST (Reset)". However, in the event of the occurrence of a packet loss during, for example, the data communication establishing process, the order of reception and the number of receptions of these packets will be different from those of CASE 0. The following CASEs 1 to 5 may occur:

CASE 1 [the order of detection: SYN, SYN, SYN+ACK, ACK, GET,
 RST] (FIG. 4)
CASE 2 [the order of detection: SYN, SYN+ACK, ACK, GET, RST]
 (FIG. 5)
CASE 3 [the order of detection: SYN, SYN+ACK, SYN+ACK, ACK,
 GET, RST] (FIG. 6)
CASE 4 [the order of detection: SYN, SYN+ACK, SYN, SYN+ACK,
 ACK, GET, RST] (FIG. 7)
CASE 5 [the order of detection: SYN, SYN+ACK, GET, RST]
 (FIG. 8)

The technique of Document 2 determines which of cases 1 to 5 is consistent with the order and number of receptions of these packets of "SYN", "SYN+ACK", "ACK", "GET" and "RST", detects the occurrences of packet losses and identifies the positions of the occurrences of packet losses, during data-communication establishment process.

FIG. 3 illustrates CASE 0, wherein the measuring apparatus 1 receives packets in the order of [SYN, SYN+ACK, ACK, GET, RST]. Since this is the ideal order for the data establishing process, the measuring apparatus 1 determines that no packet loss has occurred. Here, it is required that the intervals between receptions of the packets are within a predetermined value.

FIG. 4 illustrates CASE 1, wherein the measuring apparatus 1 receives packets in the order of [SYN, SYN, SYN+ACK, ACK, GET, RST]. This CASE 2 has two types of sub cases. One of them is a sub case illustrated in the left side of FIG. 4 and the other one is a sub case illustrated in the right side of FIG. 4. The case of the left side of FIG. 4 represents a sub case where the "SYN" data transmitted at first from the communication terminal 2 to the communication terminal 3 has been lost between the measuring apparatus 1 and the communication terminal 3. The right side of FIG. 4 represents a sub case where the "SYN+ACK" data transmitted from the communication terminal 3 to the communication terminal 2 in response to the SYN data received by the communication terminal 3 has been lost between the communication terminal 2 and the measuring apparatus 1. In any of the sub cases, the communication terminal 2 cannot receive the response ("SYN+ACK") to the transmitted "SYN" within a predetermined time and therefore retransmits "SYN". In any of the sub cases, when data is received in this order, it can be determined that a packet has been lost between the measuring apparatus 1 and the communication terminal 3.

FIG. 5 illustrates CASE 2, wherein the measuring apparatus 1 receives packets in the order of [SYN, SYN+ACK, ACK, GET, RST]. This CASE 2 represents a case where the "SYN+ACK" data that the communication terminal 3 transmitted after the reception of the "SYN" data from the communication terminal 2 has been lost between the measuring apparatus 1 and the communication terminal 3. In FIG. 5, the communication terminal 3 cannot receive the "ACK" from the communication terminal 2 within a predetermined time after the transmission of the first "SYN+ACK", and therefore retransmits the "SYN+ACK", and the retransmitted "SYN+ACK" is received by the measuring apparatus 1 and the communication terminal 2.

The CASE 2 is a case where the communication is continued by the retransmission of the "SYN+ACK" data from the communication terminal 3. Although this order of reception is the same as that of CASE 0 of FIG. 3, the interval between the arrivals of the "SYN" data and the "SYN+ACK" data in CASE 2 is larger than that in the CASE 0, and therefore the measuring apparatus 1 can easily distinguish between CASE 0 and CASE 2.

FIG. 6 illustrates CASE 3, wherein the measuring apparatus 1 receives packets in the order of [SYN, SYN+ACK, SYN+ACK, ACK, GET, RST]. In this CASE3, a packet has been lost between the communication terminal 2 and the measuring apparatus 2. This CASE 3 has two types of sub cases. One of them is a sub case illustrated in the left side of FIG. 6 and the other one is a sub case illustrated in the right side of FIG. 6.

The sub-case of the left side of FIG. 6 represents a case where the "SYN+ACK" data that the communication terminal 3 transmitted after the reception of the "SYN" data from the communication terminal 2 has been lost between the communication terminal 2 and the measuring apparatus 1 after passing through the measuring apparatus 1.

The sub-case of the right side of FIG. 6 represents a sub-case where the "ACK" data that the communication terminal 2 transmitted after the reception of the "SYN+ACK" data from the communication terminal 3 has been lost between the communication terminal 2 and the measuring apparatus 1 before passing through the measuring apparatus 1.

In any of the sub cases, the communication terminal 3 retransmits the "SYN+ACK" data. When the measuring apparatus 1 receives packets in the order of [SYN, SYN+ACK, SYN+ACK, ACK, GET, RST] as described above, the measuring apparatus 1 can determine that a packet loss has occur between the communication terminal 2 and the measuring apparatus 1.

FIG. 7 illustrates CASE 4, wherein the measuring apparatus 1 receives packets in the order of [SYN, SYN+ACK, SYN, SYN+ACK, ACK, GET, RST]. In the CASE 4, a packet has been lost between the communication terminal 2 and the measuring apparatus 1. In the CASE 4, the "SYN+ACK" data that the communication terminal 3 transmitted in response to the "SYN" data from the communication terminal 2 has been lost between the communication terminal 2 and the measuring apparatus 1, after passing through the measuring apparatus 1. The communication terminal 2 cannot receive the response from the communication terminal 3 after a lapse of a constant time and thus sends the SYN data again. In CASE 4, the measuring apparatus 1 can determine that a packet has been lost between the communication terminal 2 and the measuring apparatus 1.

FIG. 8 illustrates CASE 5, wherein the measuring apparatus 1 receives packets in the order of [SYN, SYN+ACK, ACK, GET, RST]. In CASE 5, the "ACK" data that the communication terminal 2 transmitted in response to the "SYN+ACK" data from the communication terminal 3 has been lost between the communication terminal 2 and the measuring apparatus 1. In CASE 5, the measuring apparatus 1 can determine that a packet has been lost between the communication terminal 2 and the measuring apparatus 1.

The technique of the aforementioned Document 1 may falsely detect packet losses for data which was not suffered from packet losses. Consequently, the technique of the aforementioned Document 1 may estimate packet losses to be higher than the actual value. The causes thereof will be described with reference to FIG. 9.

The prior-art technique described in Document 1 detects packet losses on the basis of only the order of serial numbers (SNs), of received packets. However, data which was transmitted from the communication terminal 2 at an earlier timing may arrive at the measuring apparatus 1 after the arrival of data which was transmitted from the communication terminal 2 at a later timing than that of the aforementioned data, depending on the condition of communication. For example, in the case of FIG. 9, data with an SN of 2000 may be supplied to the measuring apparatus 1 after data transmitted at a later timing (data with an SN of 3000 in FIG. 9) is supplied to, the measuring apparatus 1. In such a case, the data transmitted at an earlier timing (the data with the SN 2000 in FIG. 9) is determined to be packet loss, since it has an SN smaller than the maximum SN (3000 in FIG. 9) detected by the measuring apparatus 1 in the past, even though it arrived at the communication terminal 3 without causing a packet loss.

Further, the technique of Document 1 may underestimate the quality of the goodput, which is the amount of data received by the communication partner per unit time. The goodput is the amount of data reached the communication partner and can be calculated as "the amount of data transmitted from the transmission terminal minus the amount of packet losses". However, the technique of Document 1 may estimate the amount of packet losses to be higher than the actual amount, thus estimating "the amount of data transmitted from the transmission terminal minus the amount of packet losses" to be lower than the actual value.

Further, the technique of the aforementioned Document 2 can determine the positions of the occurrences of packet losses only during the data-communication establishing process (three-way hand shake). This is because the technique of Document 2 determines the positions of the occurrences of packet losses by using the order of arrivals of packets during the data-communication establishing process. Accordingly, the technique of Document 2 does not take account of the order of data communications after the communication process has been established. Thus, in the event that a packet loss occurs during data communications between the communication terminals after the completion of the data communication establishing process, the measuring apparatus 1 cannot detect the packet loss.

Furthermore, the technique of Document 2 may not accurately detect the positions of the occurrences of packet losses even during the data-communication establishing process. This technique can only determine whether a packet loss has occurred between the communication terminal 2 and the measuring apparatus 1 or between the measuring apparatus 1 and the communication terminal 3. In the case of the former packet loss, the technique cannot determine whether the packet loss occurred during the communication from the communication terminal 2 to the measuring apparatus 1 (the sub-case of the right side of FIG. 6) or during the communication from the measuring apparatus 1 to the communication terminal 2 (the sub-case of the left side of FIG. 6). Similarly, in the case of the latter packet loss, the technique cannot determine whether the packet loss occurred during the communication from the measuring apparatus 1 to the communication terminal 3 (the sub-case of the left side of FIG. 4) or during the communication from the communication terminal 3 to the measuring apparatus 1 (the sub-case of the right side of FIG. 4).

SUMMARY OF THE INVENTION

A network-quality determining technique according to an aspect of the present invention prevents false detections of packet losses due to disturbance of the order of data arrival, thus increasing the accuracy of detection of packet losses. This is because a measuring apparatus according to the aspect monitors the state of re-transmission in the network and it does not record packet losses even in the event of disturbance of the order of arrivals of received data SNs when the data receiving terminal is not outputting a retransmission requirement.

Further, according to another aspect of the present invention, the measuring apparatus is capable of accurately determining the goodput, which is the effective communication speed of the data receiving terminal. This is because the measuring apparatus determines the goodput, on the basis of the protocol header information, not the amount of data passing therethrough. Therefore, it can recognize the amount of data reached to the receiving communication terminal.

Further, according to a further aspect of the present invention, the measuring apparatus is capable of identifying the positions of occurrences of packet losses during data communications. This is because the measuring apparatus performs determination on the basis of data-transmission numbers (SNs) and reception acknowledgement (ACK) numbers which are generated during communications between the data-transmission terminal and the data reception terminal, not on the basis of the process sequence during data-establishing processes.

Furthermore, according to a further aspect of the present invention, the measuring apparatus can determine whether such packet losses occurred during the communication from the communication terminal 2 to the measuring apparatus 1 or during the communication from the measuring apparatus 1 to the communication terminal 2. Similarly, the measuring apparatus can determine whether such packet losses occurred during the communication from the measuring apparatus 1 to the communication terminal 3 or during the communication from the communication terminal 3 to the measuring apparatus 1. This is because the measuring apparatus performs determination on the basis of data-transmission numbers (SNs) and reception acknowledgement (ACK) numbers which are generated during communications between the data-transmission terminal and the data reception terminal, not on the basis of the process sequence during data-establishing processes.

Other aspects of the present invention will be apparent from the description of preferred embodiments thereof.

DETAILED DESCRIPTION OF THE PREFERRED EMBODIMENTS

Hereinafter, the, present invention will be explained by describing preferred embodiments thereof.

First Embodiment

The first embodiment of the present invention will be described in detail with reference to FIG. 10. The connection between a measuring apparatus according to the present embodiment and the network is the same as that in FIG. 1.

Figure 10:
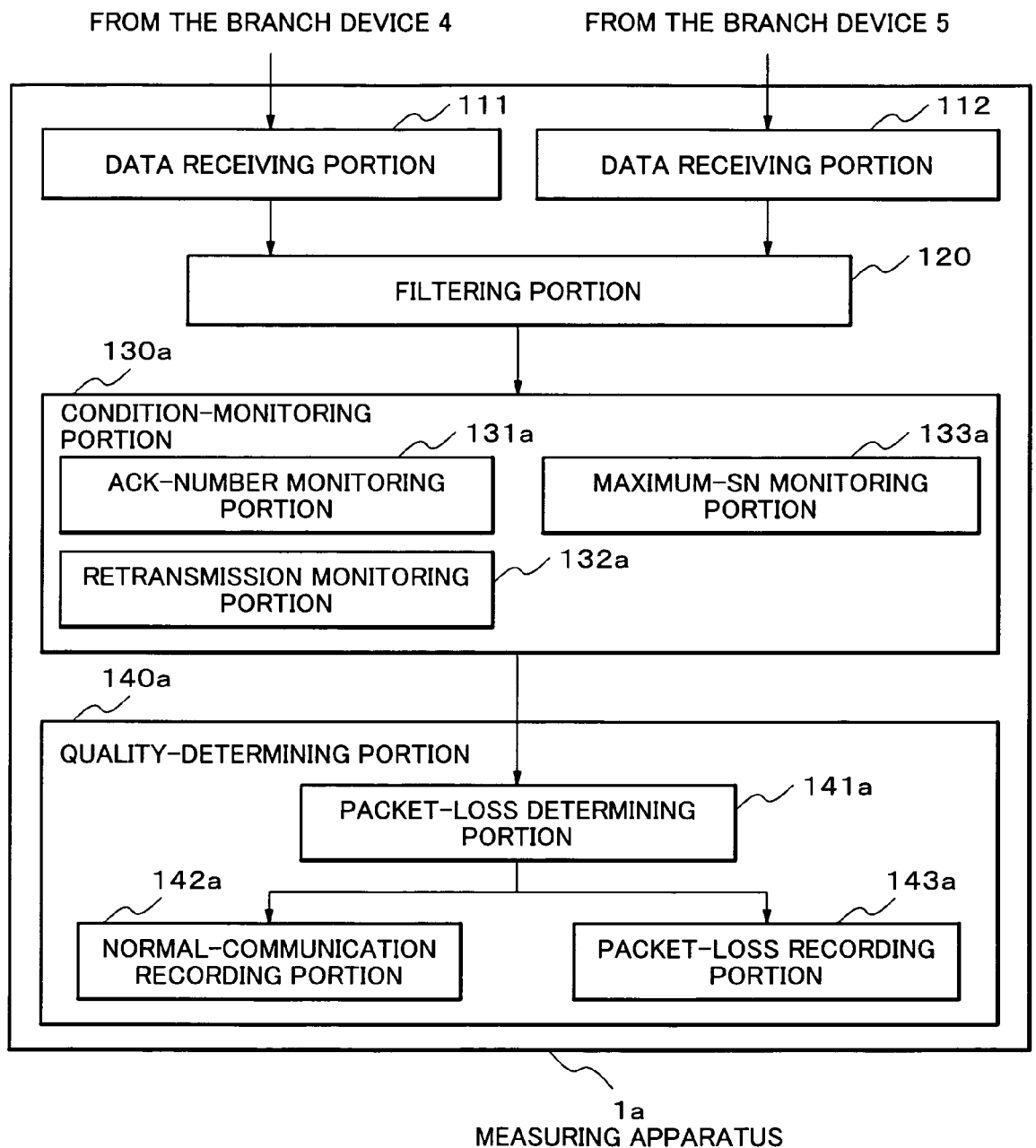
FIG. 10 is a block diagram illustrating the structure of a measuring apparatus according to a first embodiment.

FIG. 10 is a block diagram illustrating a measuring apparatus 1a according to the first embodiment. The measuring apparatus 1a consists of a data receiving portion 111, a data receiving portion 112, a filtering portion 120, a condition monitoring portion 130a, and a quality determining portion 140a. The condition monitoring portion 130a includes an ACK-number monitoring portion 131a, a retransmission monitoring portion 132a and a maximum-SN monitoring portion 133a. The quality determining portion 140a includes a packet-loss determining portion 141a, a normal-communication recording portion 142a and a packet-loss recording portion 143a. In the present embodiment, the measuring apparatus 1a starts a process by capturing data flowing through the network at the data receiving portions 111, 112.

Figure 1:
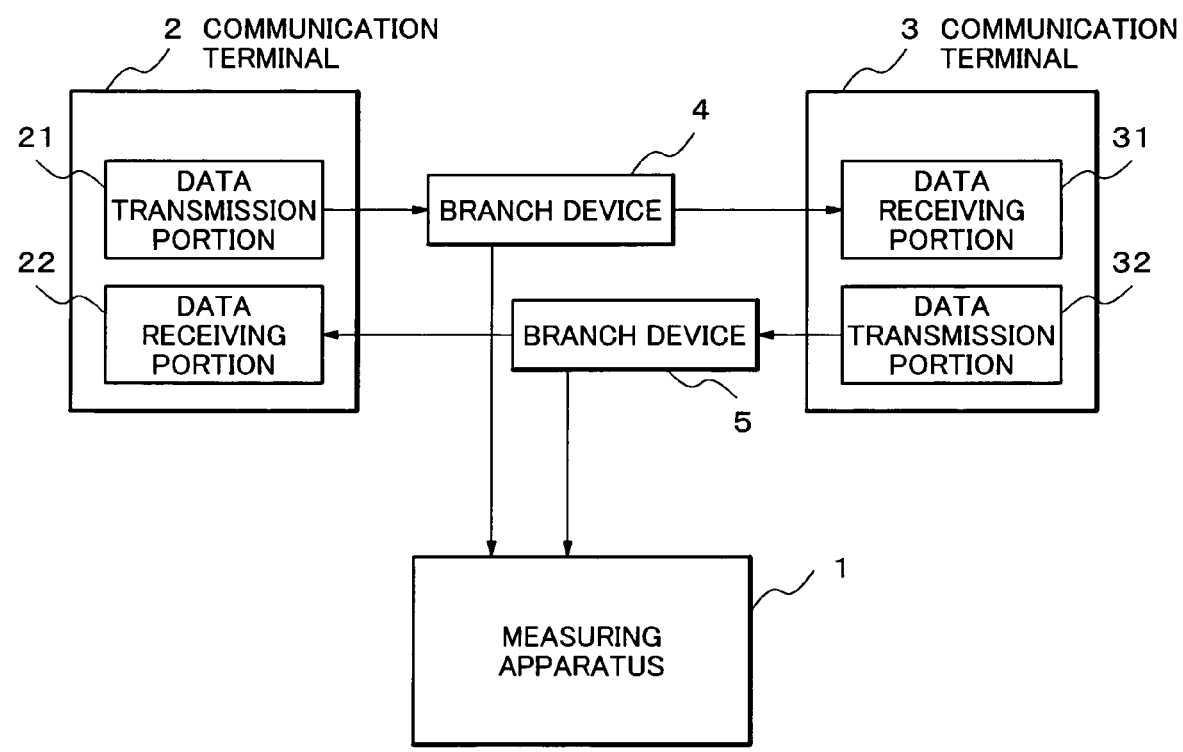
FIG. 1 is a view illustrating an exemplary field of application of a technique relating to the present invention.
Figure 2:
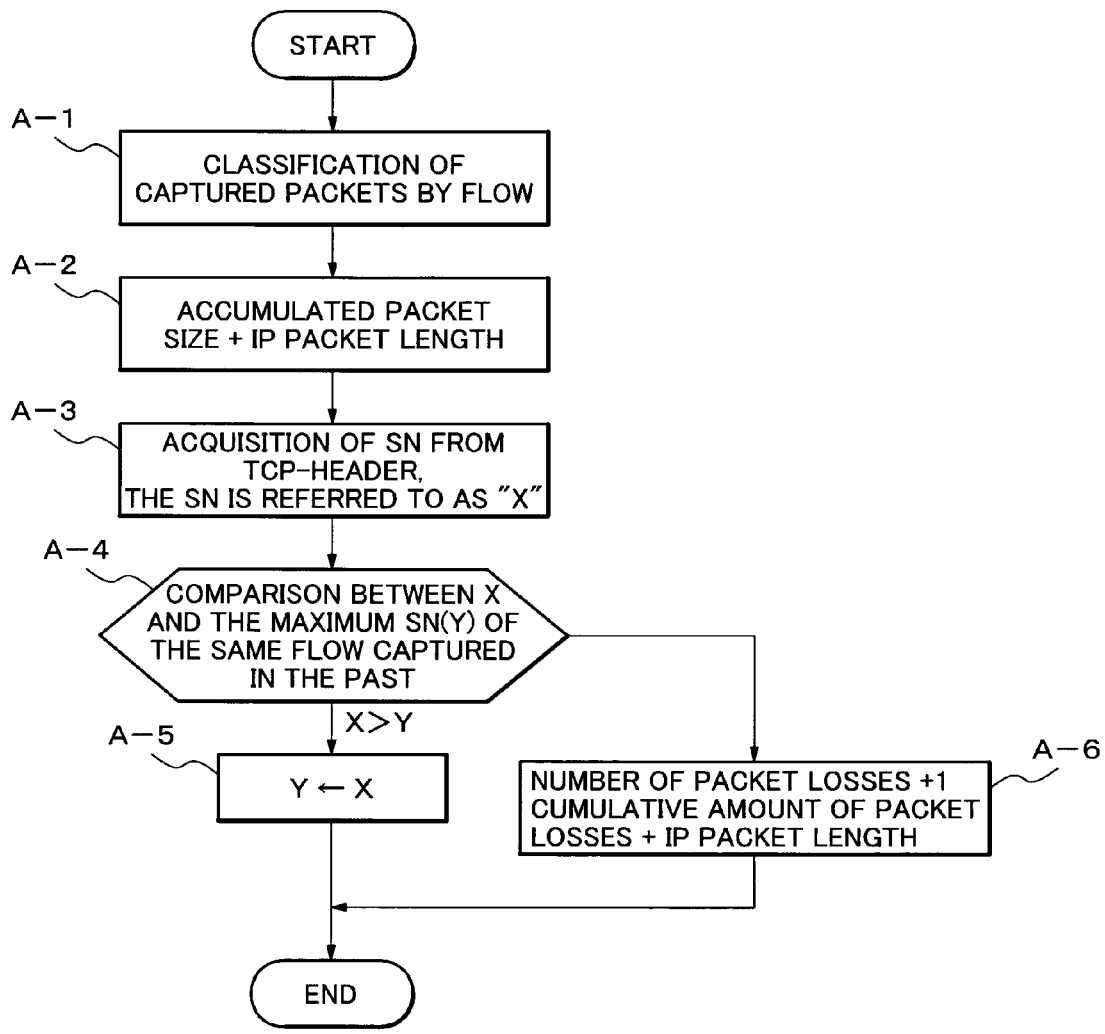
FIG. 2 is a view illustrating the outline of processes according to a first conventional technique for determining the quality of TCP communications.
Figure 3:
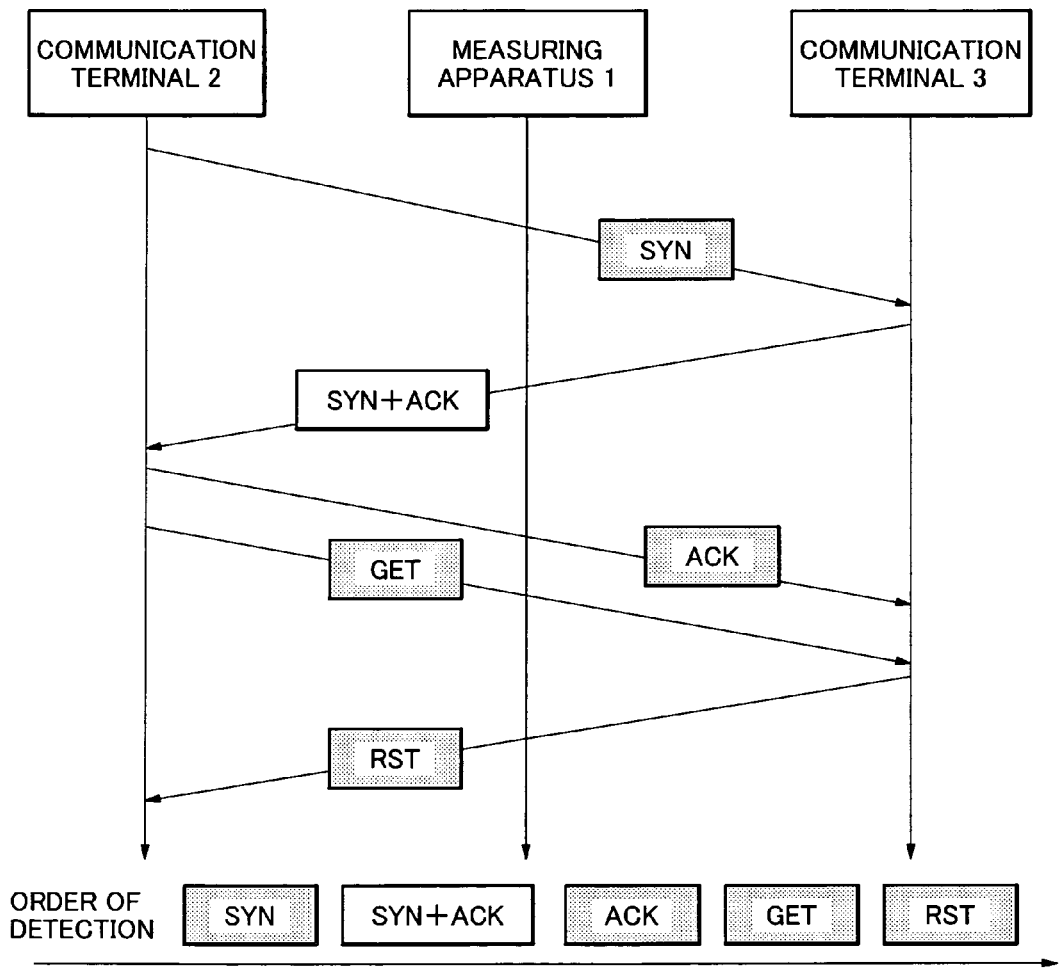
FIG. 3 is a diagram illustrating an HTTP flow of a TCP communication when no packet loss occurs.
Figure 4:
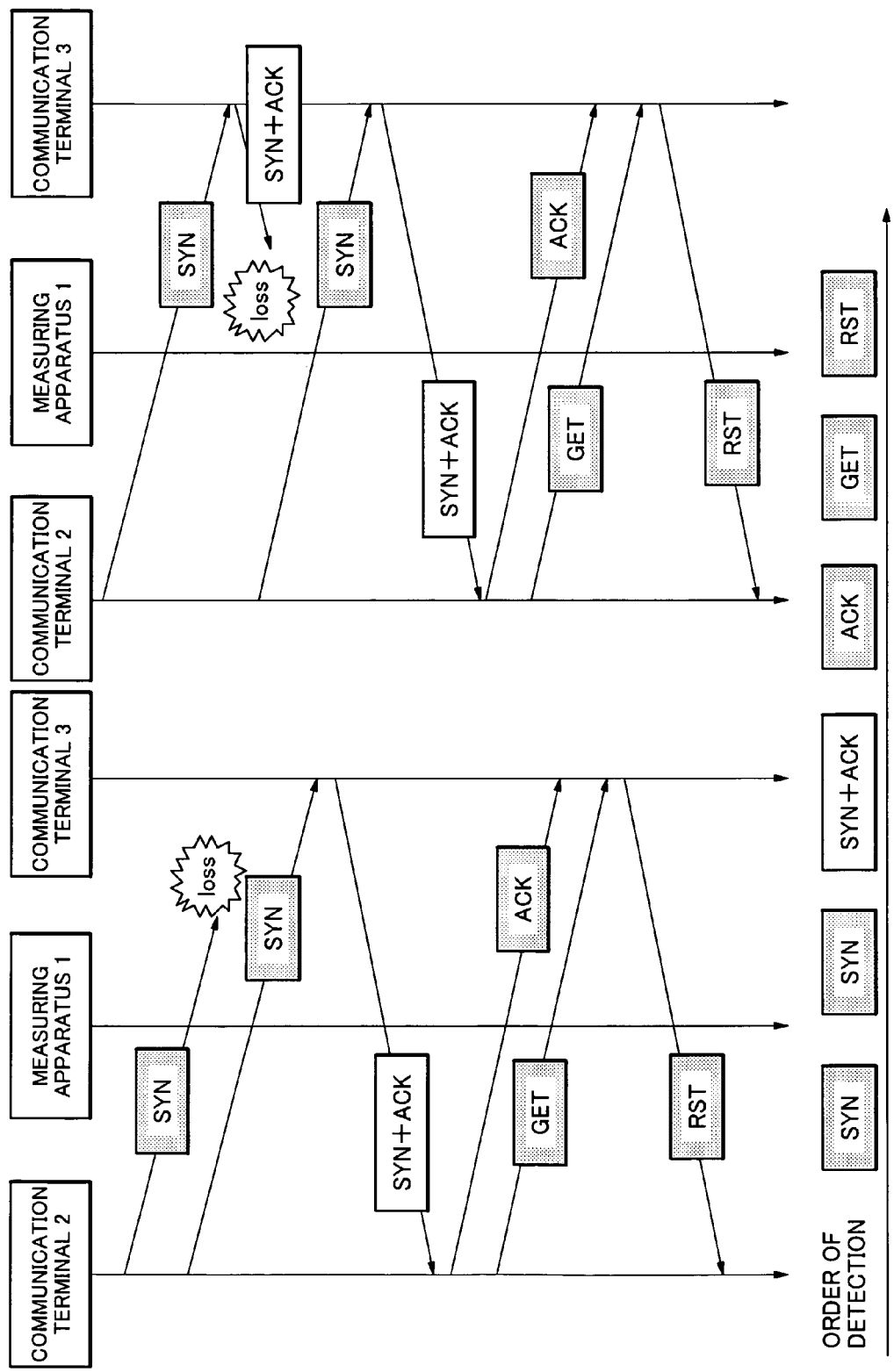
FIG. 4 is a diagram illustrating a first exemplary conventional HTTP flow of a TCP communication when a packet loss occurs.
Figure 5:
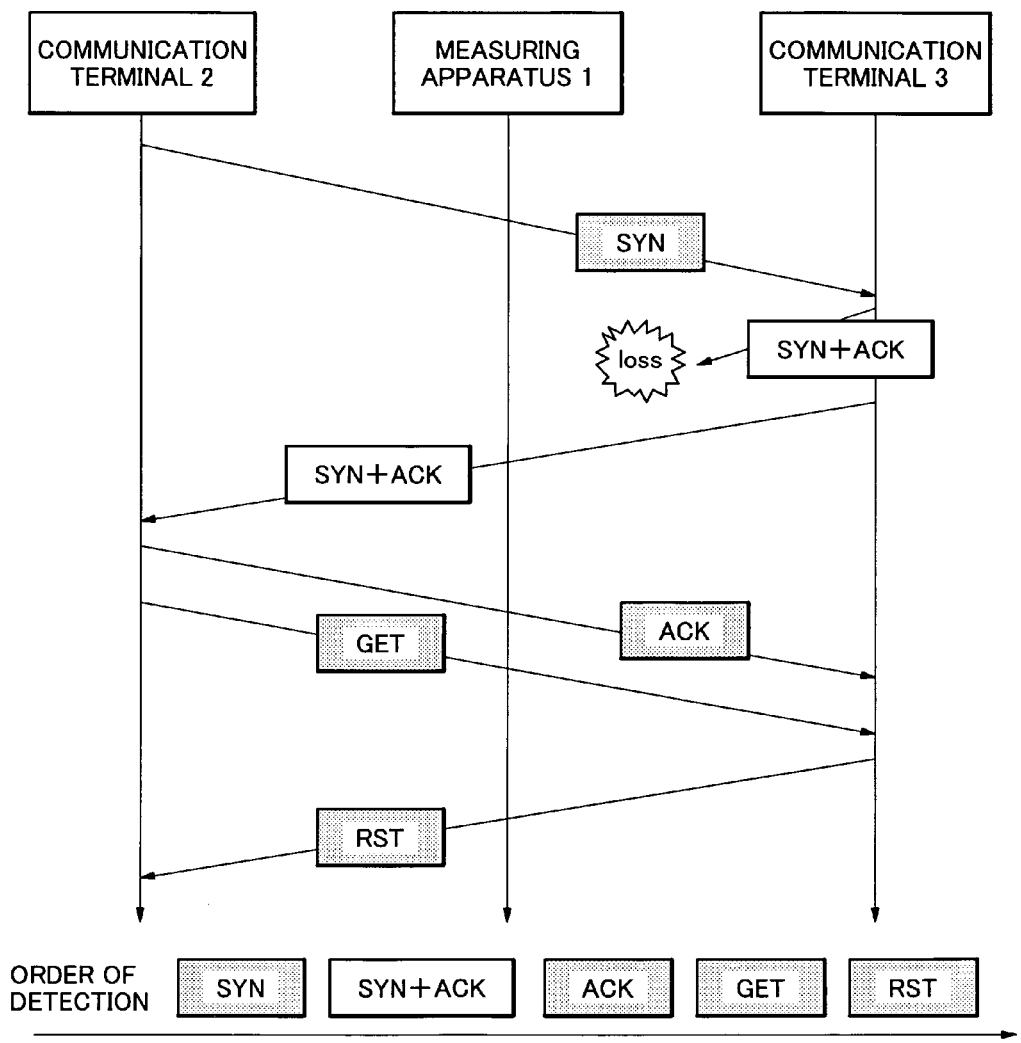
FIG. 5 is a diagram illustrating a second exemplary conventional HTTP flow of a TCP communication when a packet loss occurs.
Figure 6:
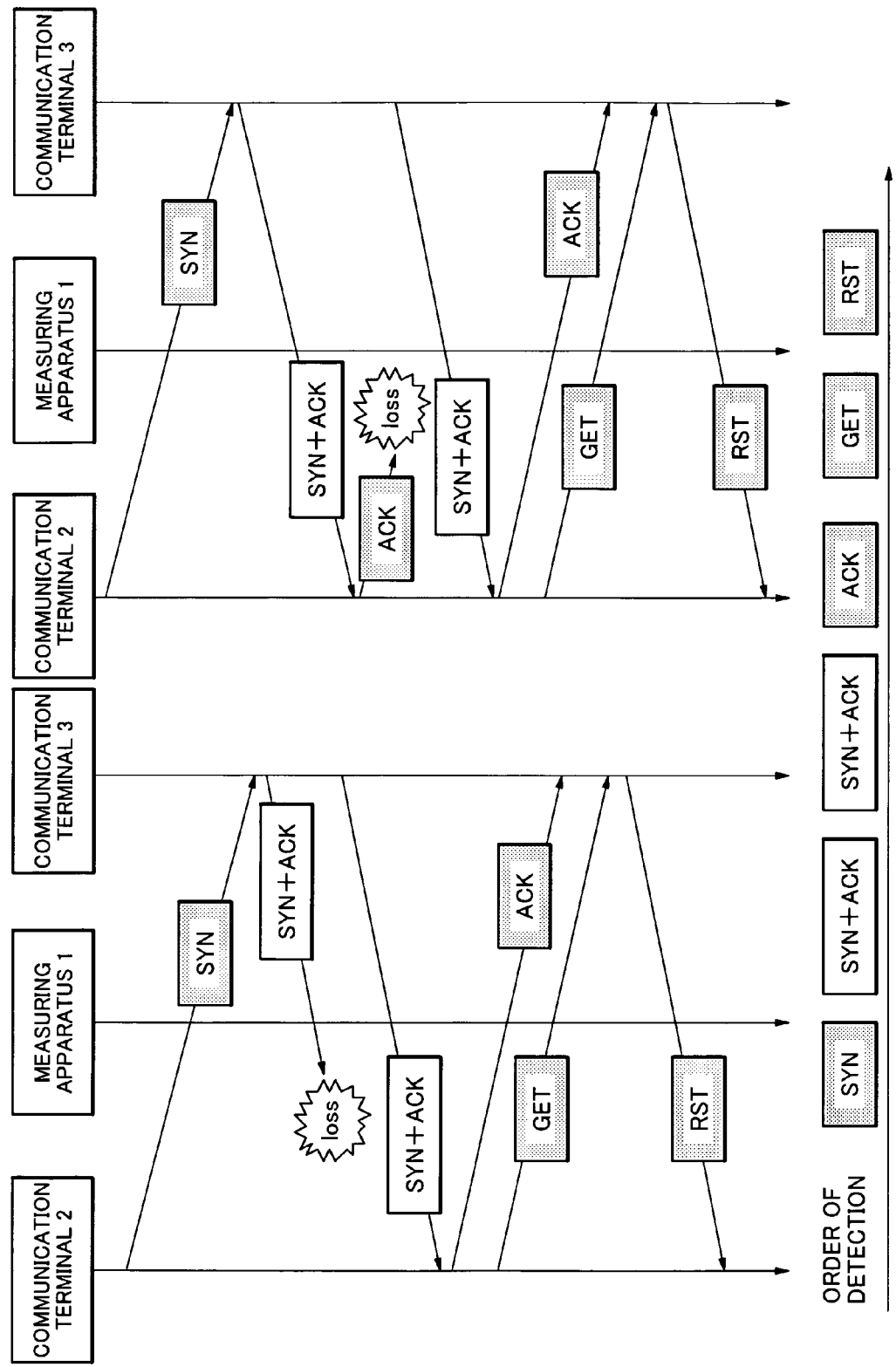
FIG. 6 is a diagram illustrating a third exemplary conventional HTTP flow of a TCP communication when a packet loss occurs.
Figure 7:
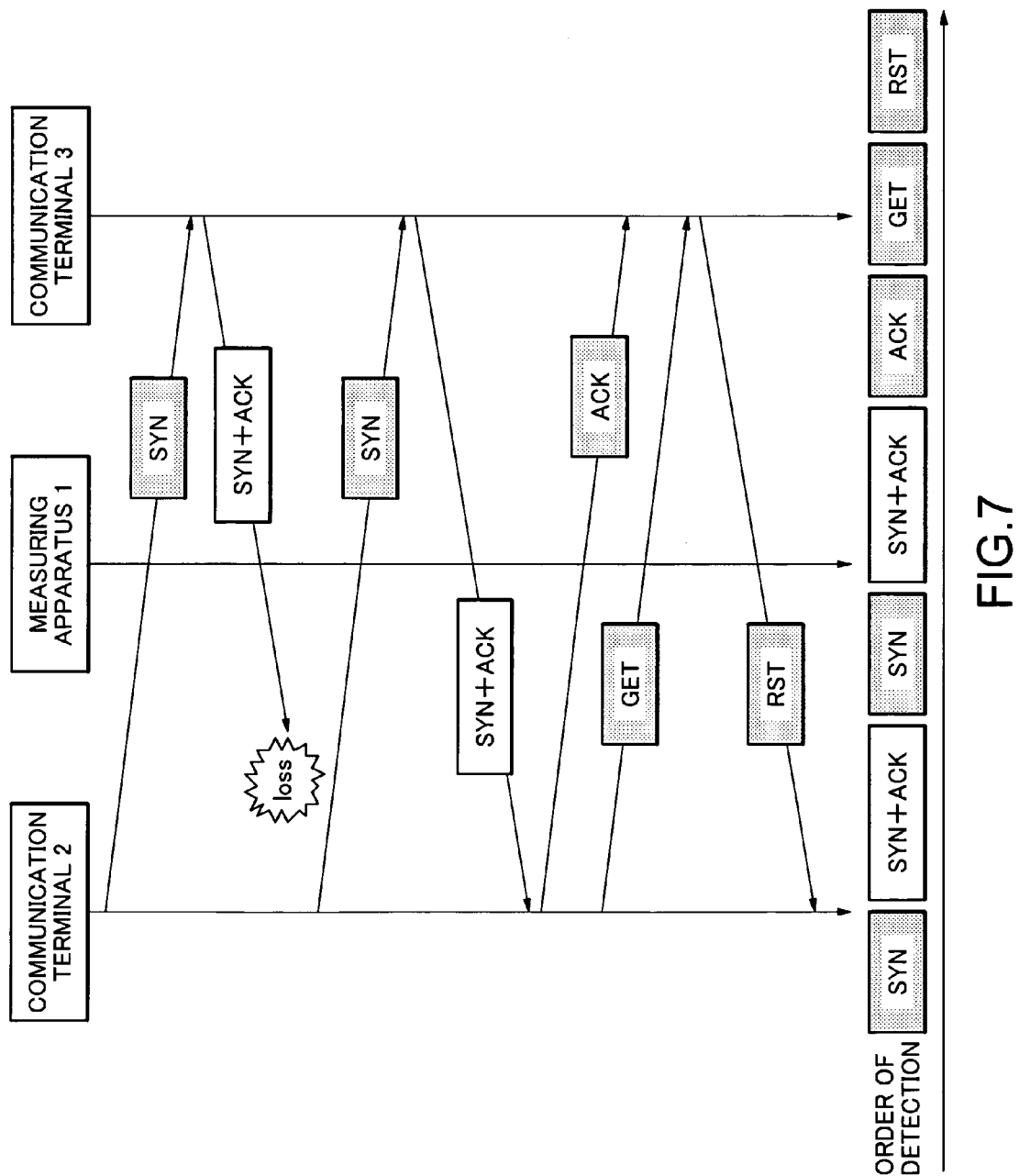
FIG. 7 is a diagram illustrating a fourth exemplary conventional HTTP flow of a TCP communication when a packet loss occurs.
Figure 8:
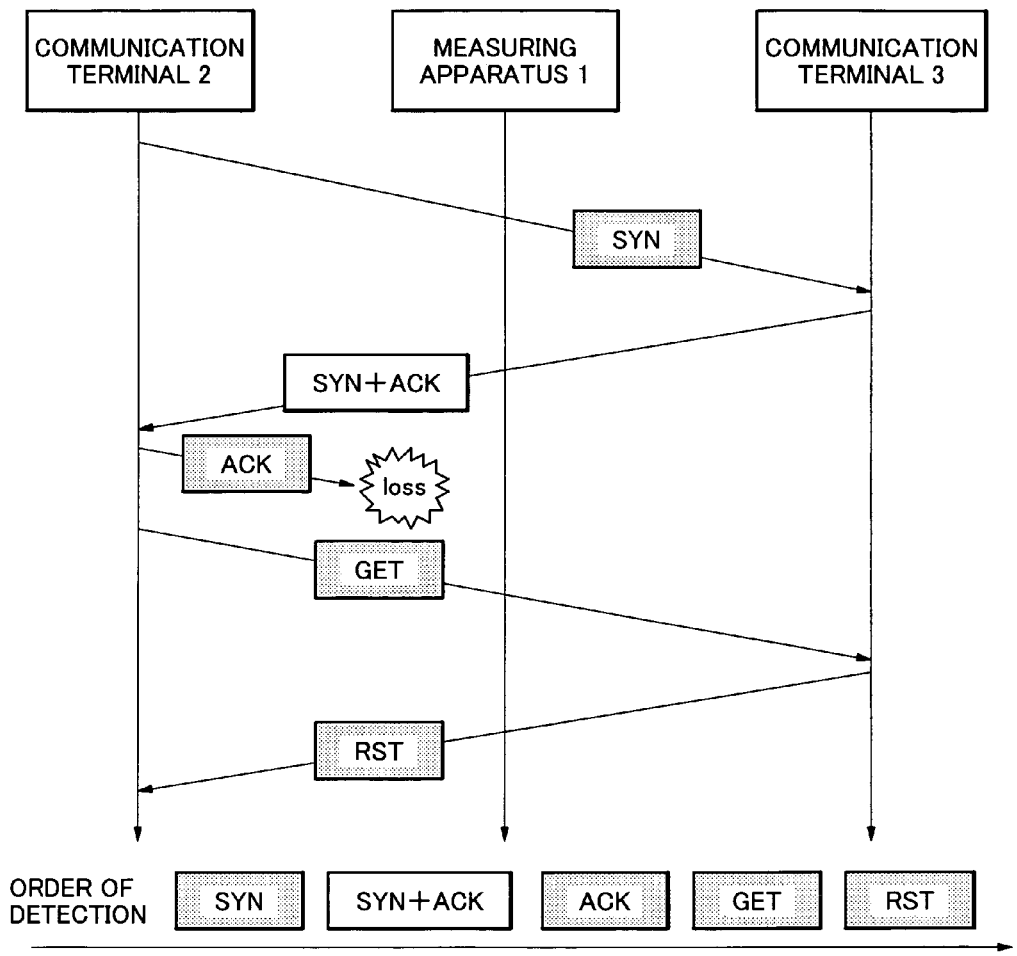
FIG. 8 is a diagram illustrating a fifth exemplary conventional HTTP flow of a TCP communication when a packet loss occurs.
Figure 9:
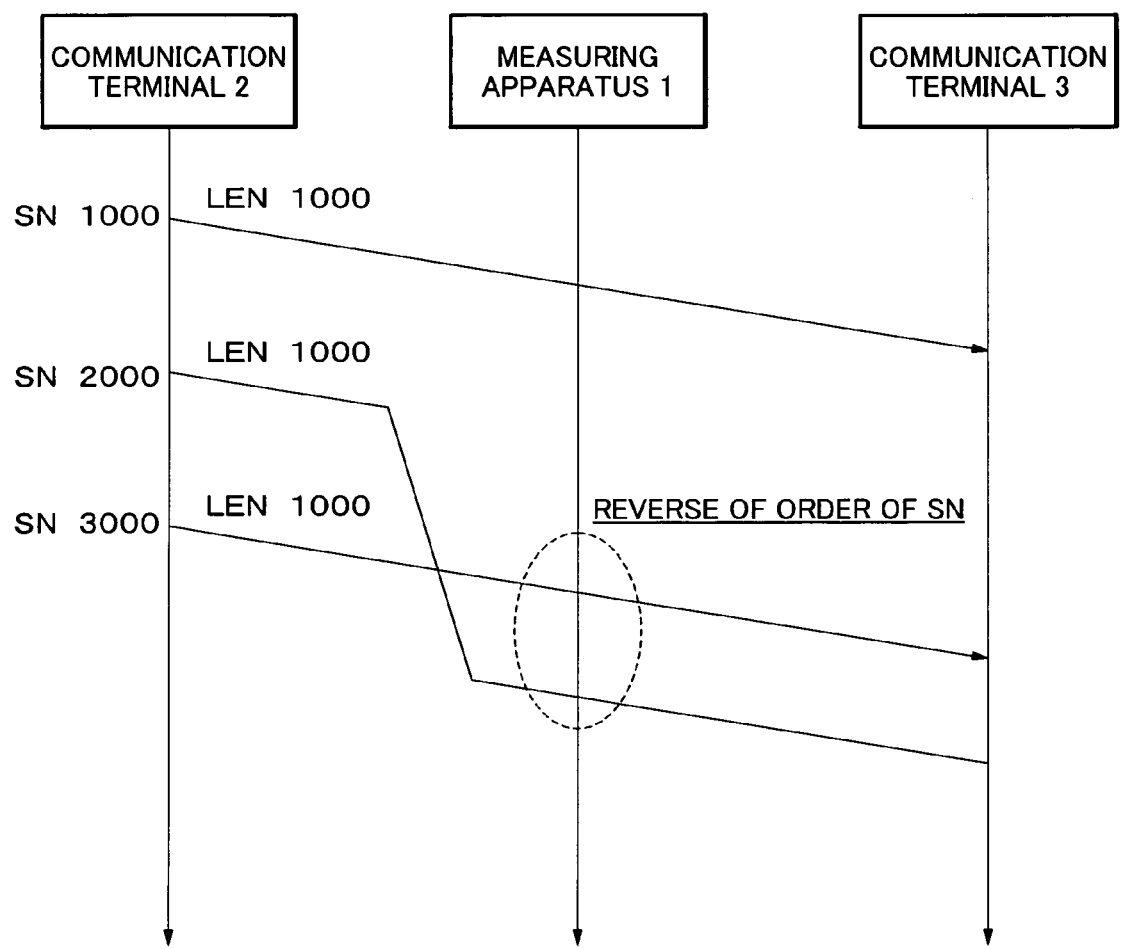
FIG. 9 is a diagram illustrating a problem of a first conventional method.

The data receiving portion 111 receives data from a branch device 4 in FIG. 1 while the data receiving portion 112 receives data from a branch device 5. The data receiving portion 111 and 112 transfer the received data to the filtering portion 120. Preferably, the data receiving portion 111 and the data receiving portion 112 record the data reception time and transfer the reception time to the filtering portion 120 along with the received data.

The filtering portion 120 identifies the transmission/reception IP (Internet Protocol) address, the transmission/reception TCP (Transmission Control Protocol) port number, the protocol number, etc., in the received data and classifies the received data by flow. Further, the filtering portion 120 determines whether or not the received data has valid ACK-side information for the flow, when classifying the received data by flow. The filtering portion 120 notifies the condition monitoring portion 130a of the results thereof. Further, the filtering portion 120 determines the throughput, which is the amount of data of the same flow received per unit time.

In the present invention, the same flow means a series of processes which are performed, for example, when a transmission terminal A transmits data to a receiving terminal B.

The condition monitoring portion 130a includes the ACK-number monitoring portion 131a, the retransmission monitoring portion 132a and the maximum-SN monitoring portion 133a. The ACK-number monitoring portion 131a retains ACK numbers of received data for each flow, in the order of reception. The retransmission monitoring portion 132a stores, for each flow, the ACK number for data required to be retransmitted, by the data receiving terminal. The maximum-SN monitoring portion 133a retains, for each flow, the maximum value, out of SNs of data which have been received in the past.

The condition monitoring portion 130a extracts, for each flow, the SNs (sequence numbers) in the TCP protocol headers of received data. The condition monitoring portion 130a extracts the ACK number in the case where the received data is an acknowledgement signal.

When the received data has valid ACK-side information, the condition monitoring portion 130a compares the ACK number of the previous reception which is retained by the ACK-number monitoring portion 131a with the ACK number of the received data. From the result of the comparison, it is determined whether or not the ACK number of the received data is greater (namely, whether or not the ACK number is increased). When the ACK number is not increased, the condition monitoring portion 130a determines whether or not the data receiving terminal is requiring data retransmission.

Further, there are various techniques known as methods for determining whether or not the data receiving terminal is requiring data retransmission.

For example, in the case of a normal TCP, the data receiving terminal sends, to the transmission terminal, reception-acknowledgement data including an ACK number which is the maximum SN value out of SNs that have been received from the transmission terminal. Further, in the event that data could not be received, the receiving terminal sends, to the transmission terminal, reception-acknowledgement data including an ACK number which is the maximum SN value but of SNs that could be received therefrom. In a normal TCP, when the data transmission terminal has received the same ACK number three or more times, the data transmission terminal determines that the receiving terminal is requiring data retransmission. Then, the data transmission terminal retransmits, to the receiving terminal, the data specified by the ACK number that the data transmission terminal received (namely, the data specified by the SN equal to the received ACK number plus one) Accordingly, in a normal TCP, by detecting multiple receptions of the same ACK number, it can be determined that the data receiving terminal is requiring retransmission.

Also, when Selective Acknowledgement (SACK) option is adopted, the data receiving terminal outputs a retransmission requirement including the SN of data being required to be retransmitted. Consequently, by detecting such a retransmission requirement, the measuring apparatus can determines whether or not the receiving terminal is requiring retransmission.

Further, it can be determined that the receiving terminal is requiring retransmission if an ACK signal indicative of data reception is not received within a certain time period after the receiving terminal receives data from the transmitting terminal.

When the condition monitoring portion 130a determines that the receiving terminal is requiring retransmission, the condition monitoring portion 130a stores, in the retransmission monitoring portion 132a, the ACK number for the data required to be retransmitted.

When the received data includes SN-side information, the condition monitoring portion 130a compares the SN value in the received data with the value stored in the maximum-SN monitoring portion 133a, which stores the maximum value out of the SNs of received data which have been received in the past. Then, the condition monitoring portion 130a stores the greater value in the maximum-SN monitoring portion 133a.

Further, by observing the amount of increase of the ACK number per unit time, the condition monitoring potion 130a can determine the goodput, which is the amount of data which has been actually received by the data receiving terminal within a unit time.

The quality determining portion 140a detects packet losses and determines the positions of occurrences of packet losses. The quality determining portion 140a includes a packet-loss determining portion 141a, a normal-communication recording portion 142a and a packet-loss recording portion 143a.

The packet-loss determining portion 141a determines, by referring to the state of the condition monitoring portion 130a, whether or not a packet loss has occurred. On the basis of the result of the determination, when no packet loss has occurred, the packet-loss determining portion 141a records the amount of communication in the normal-communication recording portion 142a. On the other hand, if a packet loss has occurred, it records the amount of loss in the packet-loss recording portion 143a.

Figure 11:
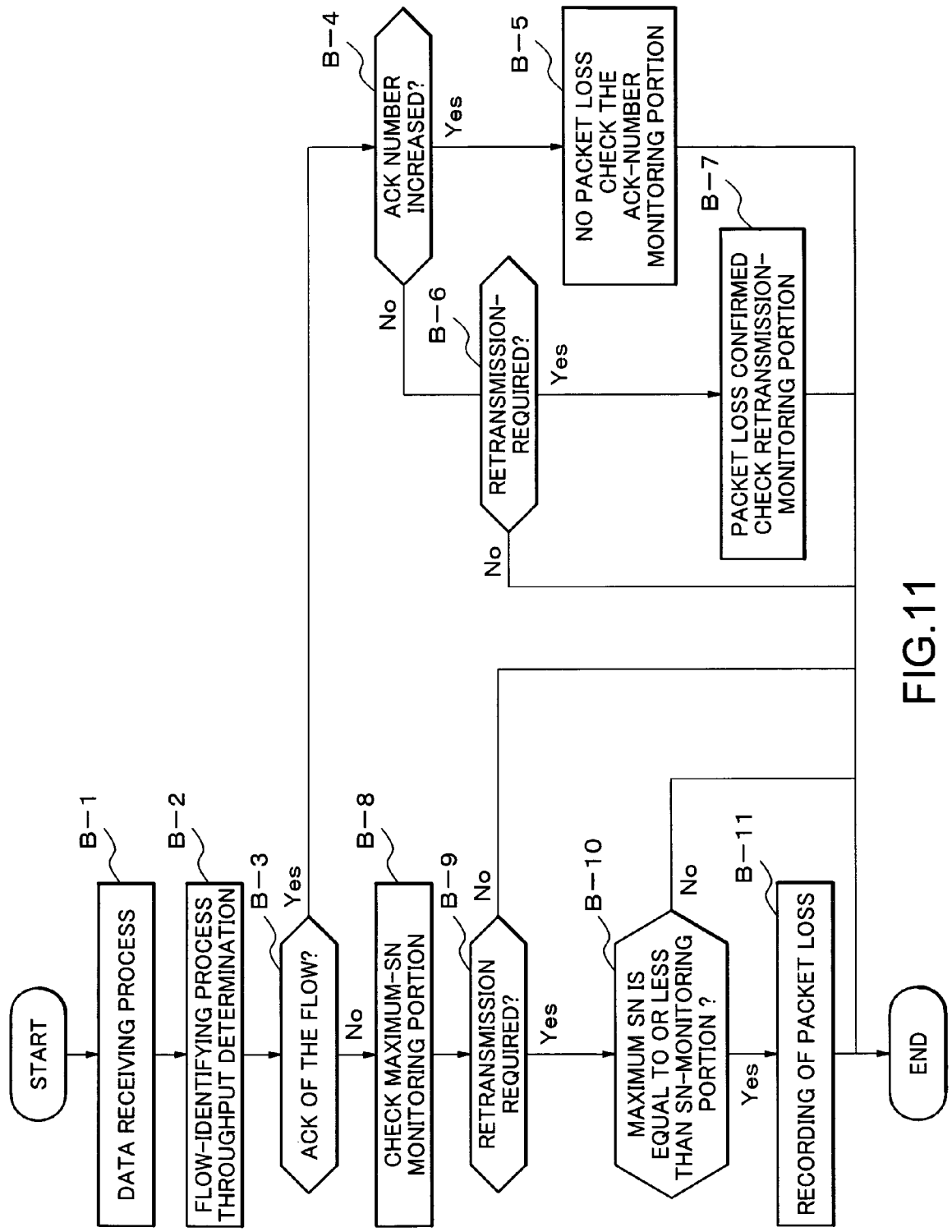
FIG. 11 is a flow chart illustrating a process flow of the measuring apparatus according to the first embodiment.

Next, the operation of the measuring apparatus 1a will be described in greater detail. FIG. 11 is a flow chart for describing the operation of the measuring apparatus 1a.

At a step B-1, the data receiving portion 111 receives data from the branch device 4 or the data receiving portion 112 receives data from the branch device 5 and the data receiving portion 111 or the data receiving portion 112 transfers the received data to the filtering portion 120.

At a step B-2, the filtering portion 120 identifies the flow of the received data on the basis of the transmission/reception IP address, the transmission/reception TCP port number, the protocol number, etc., and monitors the state for each flow. Further, the filtering portion 120a determines the throughput, which is the amount of data of the same flow inputted to the measuring apparatus 1a per unit time.

At a step B-3, the filtering portion 120 determines whether or not the received data includes valid ACK-side information for the same flow.

In TCP communication, single data packet is formed to be capable of including ACK-side information and SN-side information. For example, in the case of bi-directional communication, in many cases, single data packet includes ACK-side information data for one of the flows and SN-side information data for the other flow. In such a case, the measuring apparatus treats the ACK-side information data and the SN-side information as information for different flows.

When it is determined at the step B-3 that the received data includes valid ACK-side information, the operation of the measuring apparatus proceeds to a step B-4. At the step B-4, the condition monitoring portion 130a compares the ACK number in the received data with the ACK number of the previous reception to determine whether or not the ACK number is increased. As previously described, the ACK-number monitoring portion 131a stores the ACK number of the previous reception.

When it is determined at the step B-4 that the ASK number is increased, no packet loss has occurred and thus data communication has been successfully performed. In this case, the condition monitoring portion 130a causes the ACK-number monitoring portion 131a to store the ACK number which is received this time. Then, the operation of the measuring apparatus 1a returns to the step B-1 where it waits for a next data input.

When it is determined at the step B-4 that the ACK number is not increased, the process of the measuring device 1a proceeds to a step B-6. At the step B-6, the condition monitoring portion 130a determines whether or not the data receiving terminal is requiring data retransmission. When data retransmission is not required, the condition monitoring portion 130a causes the ACK-number monitoring portion 131a to store the ACK number that is received this time. Then, the operation of the measuring device 1a returns to the step B-1 where it waits for a next data input.

If it is determined at the step B-6 that the data receiving terminal is requiring data retransmission, this state shows that a packet loss has occurred and the data receiving terminal is requiring data retransmission. In order to store this fact, at a step B-7, the condition monitoring portion 130a causes the retransmission monitoring portion 132a to store the ACK number for data that is currently required to be retransmitted. Further, the condition monitoring portion 130a causes the ACK-number monitoring portion 131a to store the ACK number that was received this time. Then, the operation of the measuring apparatus 1a returns to the step B-1 where it waits for a nest data input.

On the other hand, if it is determined at the step B-3 that the received data includes SN-side information (namely, it does not include valid ACK-side information for the same flow), the condition monitoring portion 130a checks the SN value stored in the maximum-SN monitoring portion 133a, at a step B-8. When the SN of the current received data is greater than the value stored in the maximum-SN monitoring portion 133a, the value in the maximum-SN monitoring portion is updated.

Next, at a step B-9, the condition monitoring portion 130a refers to the value of the ACK number stored in the ACK-number monitoring portion 131a and the value of the ACK number for the data required to be retransmitted, which is stored in the retransmission monitoring portion 132a, and determines whether or not the data receiving terminal is requiring data retransmission. When the maximum value of ACK numbers stored in the ACK-number monitoring portion 131a is in agreement with the value of the number of the data required to be retransmitted, which is stored in the retransmission monitoring portion 132a, the condition monitoring portion 130a determines that data is being retransmitted.

When data retransmission is not being required, the operation of the measuring device 1a returns to the step B-1 where it waits for a next data input.

When it is determined at the step B-9 that data is being retransmitted, the operation of the measuring apparatus la proceeds to a step B-10.

At the step B-10, the packet-loss determining portion 141a compares the SN value of the received data with the SN value stored in the maximum-SN monitoring portion 133a.

When the SN value of the received data is in agreement with the value stored in the maximum-SN monitoring portion 133a, but the SN value of the received data is not in agreement with the value stored in the retransmission monitoring portion 132a, the current received data is data transmitted from the transmission terminal before the retransmission requirement reached the data transmission terminal or data is being retransmitted but the data is new data transmitted from the transmission terminal. Therefore, the packet-loss determining portion 141a determines that the current received data is not retransmitted data and records the amount of the current received data in the normal-communication recording portion 142a. Then, the operation of the measuring apparatus 1a returns to the step B-1 where it waits for a next data input.

When it is determined at the step B-10 that the SN value of the received data is smaller than the value stored in the maximum-SN monitoring portion 133a or that the SN value of the received data, the value stored in the maximum-SN monitoring portion 133a and the value stored in the retransmission monitoring portion 132a are equal to one another, the current received data is retransmitted data. Thus, this received data is data which has been transmitted at least twice and the first-transmitted data has been lost during communication. Thus, at a step B-11, the packet-loss determining portion 141a records the amount of the current received data in the packet-loss recording portion 143 (step B-11).

These are the contents of the process of the measuring apparatus 1a according to the first embodiment of the present invention.

As previously described, according to the technique described in Document 1, when data is received, the maximum value out of SNs which have been received in the past is compared with the SN of the currently-received data and, when the SN of the current received data is smaller, the current received data is determined to be retransmitted data. Therefore, with the technique described in Document 1, in the event that the order of packets has been disturbed in the network, thus causing a current received SN to be smaller than the SN of previously-received data, this is falsely regarded as the occurrence of packet losses even if no packet loss has actually occurred.

On the contrary, according to the present embodiment, the change in the ACK number is monitored and, if a retransmission requirement is detected, the ACK number for the data required to be retransmitted is stored in the retransmission monitoring portion 132a. Further, according to the present embodiment, only when the value stored in the ACK-number monitoring portion 131a is equal to the value stored in the retransmission monitoring portion 132a (namely, when the receiving terminal is being requiring retransmission), the maximum value out of SNs which have been received in the past is compared with the SN value of the currently-received data to determine whether or not a packet loss has occurred. Consequently, according to the present embodiment, when there is no retransmission requirement, even if the order of arrival of packets is disturbed, it will not be determined that a packet loss has occurred. Thus, the present embodiment can prevent false detection of packet losses due to fluctuations of the order of arrival.

The present embodiment has been described by exemplifying an apparatus for determining the quality of TCP communication, for easier understanding. However, it is apparent that the present embodiment is generally applicable to communication protocols which offer transmission information indicative of the order of data transmissions, in transmitted data, and also offer retransmission schemes for addressing data losses. For example, the present embodiment is generally applicable to protocols which offer retransmission schemes, such as High Speed TCP (HSTCP), Stream Control Transmission Protocol (SCTP), Datagram Congestion Control Protocol (DCCP), etc.

Further, the fields of applications of the present embodiment are not limited to those employing branch devices which have no influences on the to-be measured network and the traffic, as the techniques of the aforementioned Document 1 and Document 2. The present embodiment is applicable to any fields which allow acquiring data through networks. For example, the present embodiment is applicable to a structure as in FIG. 12 which employs a data-relay terminal inserted between communication terminals thereby having influences on the to-be measured network and the traffic. The data-relay terminal in FIG. 12 may be an ethernet switch for data transmission at the layer 2, a router for data transmission at the layer 3, a gate way for transmission at the layer 4 or upper layers and represents terminals for transmitting data as such or by changing the protocol or terminals having additional functions of balancing loads or controlling bands.

Second Embodiment

Next, the second embodiment of the present invention will be described.

Figure 13:
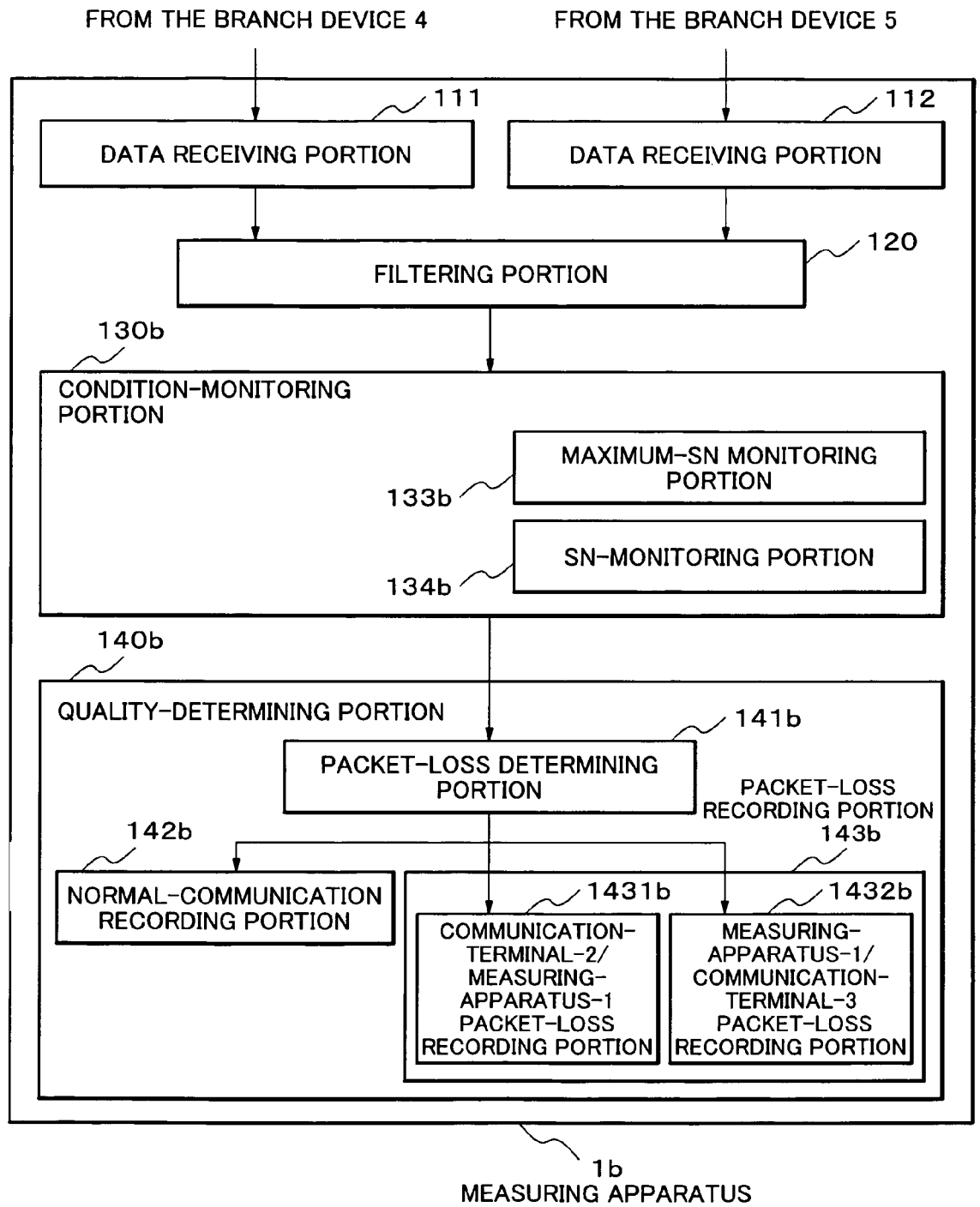
FIG. 13 is a block diagram illustrating the structure of a measuring apparatus according to a second embodiment.

FIG. 13 is a block diagram illustrating the structure of a measuring apparatus 1b according to the second embodiment of the present invention. Like numerals designate similar components to those of the aforementioned embodiment and redundant description thereof will be omitted. In the second embodiment, similarly, the measuring apparatus 1b starts processes by capturing data flowing through the network.

As illustrated in FIG. 13, the measuring apparatus 1b consists of a data receiving portion 111 for receiving data from a branch device 4, a data receiving portion 112 for receiving data from a branch device 5, a filtering portion 120 for identifying and classifying input data by flow, a condition monitoring portion 130b for checking the current condition of the network, and a quality determining portion 140b for detecting packet losses and determining the positions of the occurrences of packet losses.

Data inputted from the branch device 4 is received by the data receiving portion 111 while data from the branch device 5 is received by the data receiving portion 112. The data receiving portions 111, 112 transfer the received data to the filtering portion 120. Preferably, the data receiving portions 111 and 112 transfer the reception times of received data to the filtering portion 120 along with the received data.

The filtering portion 120 identifies and classifies flows and notifies the condition monitoring portion 130b of the result of the identification and classification, similarly in the first embodiment.

The condition monitoring portion 130b includes a maximum-SN monitoring portion 133b and an SN monitoring portion 134b. The maximum-SN monitoring portion 133b stores the maximum SN out of received SNs. The SN monitoring portion 134b incorporates an SN monitoring table for storing all the SNs of received data and storing the number of times that each of the SNs have been received.

The quality determining portion 140b includes a packet-loss determining portion 141b, a normal-communication recording portion 142b for recording the amount of data determined to be normally transmitted without packet loss, and a packet-loss recording portion 143b for storing the amount of data determined to be packet losses. The packet-loss recording portion 143b is constituted by a communication-terminal 2/measuring-apparatus 1 packet-loss recording portion 1431b for recording the amount of packet losses occurred between the measuring apparatus 1 and the communication terminal 2, and a communication-terminal 3/measuring-apparatus 1 packet-loss recording portion 1432b for recording the amount of packet losses occurred between the measuring apparatus 1 and the communication terminal 3.

The packet-loss determining portion 141b determines whether or not a packet has been lost, while monitoring the state of the condition monitoring portion 130b.

If no packet loss has occurred, the quality determining portion 140b records the amount of received data in the normal-communication recording portion 142b.

If a packet loss has occurred, the quality determining portion 140b records the amount of received data in one of "the communication-terminal 2/measuring-apparatus 1 packet-loss recording portion 1431b" and "the measuring-apparatus 1/communication-terminal 3 packet-loss recording portion 1432b", depending on the position of the occurrences of the packet loss. Namely, in the event that a packet loss has occurred between the communication terminal 2 and the measuring apparatus 1, the quality determining portion 140b records the amount of received data in the communication-terminal 2/measuring-apparatus 1 packet-loss recording portion 1431b. In the event that a packet loss has occurred between the measuring apparatus 1 and the communication terminal 3, the quality determining portion 140b records the amount of received data in the measuring-apparatus 1/communication-terminal 3 packet-loss recording portion 1432b.

Subsequently, with reference to FIG. 14, the operation of the measuring apparatus 1b according to the present embodiment will be described.

Figure 14:
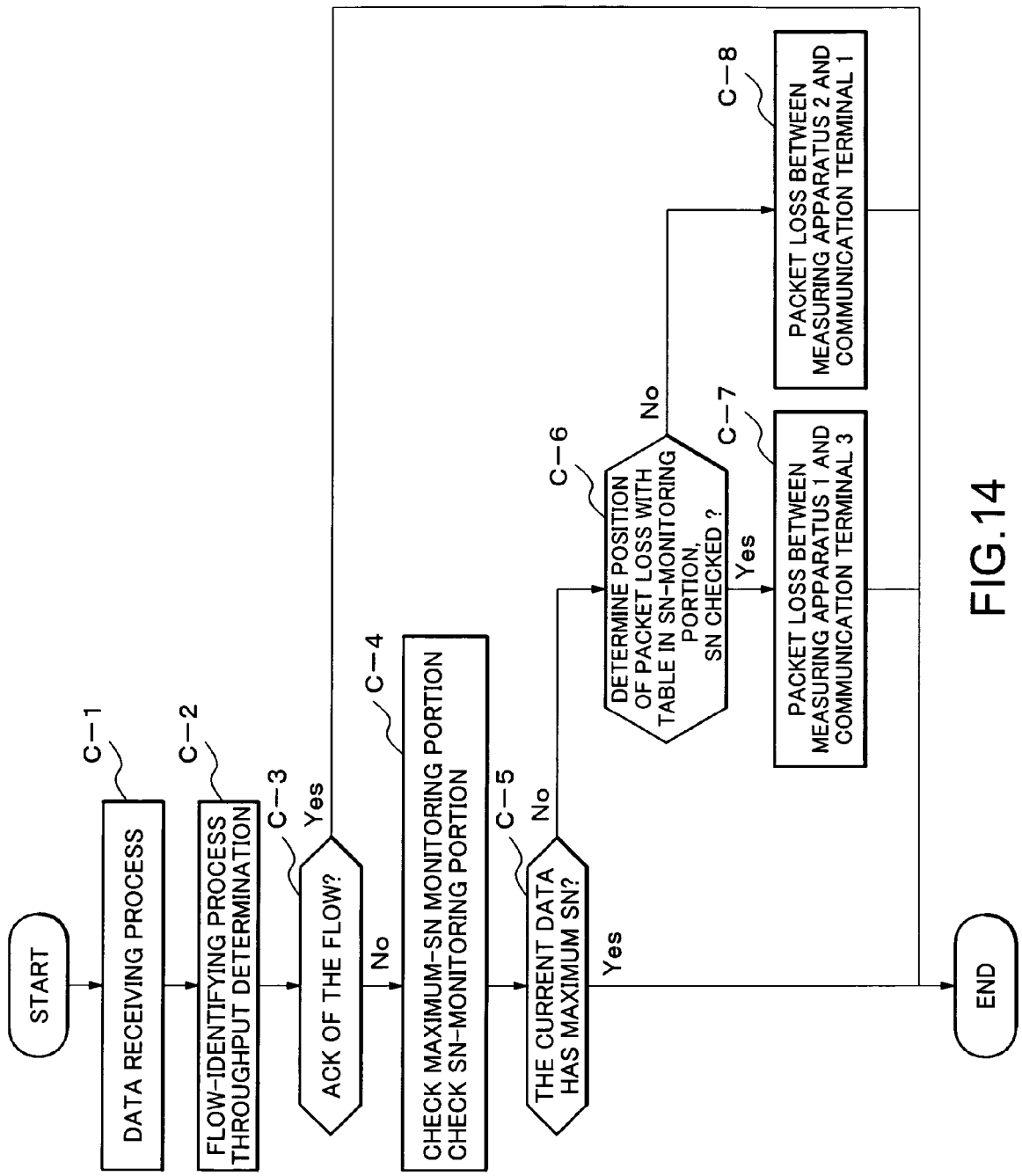
FIG. 14 is a flow chart illustrating a process flow of the measuring apparatus according to the second embodiment.

FIG. 14 is a flow chart describing methods for calculating the throughput, the goodput and packet losses and an operation for determining the positions of occurrences of packet losses, which are executed at the measuring apparatus 1b.

At a step C-1, the data receiving portions 111, 112 receive data from the branch devices 4, 5, respectively. The measuring apparatus 1b starts processes with this data reception. The received data is transferred to the filtering portion 120 and then the process of a step C-2 is started.

At the step C-2, the filtering portion 120 identifies and classifies the received data by the flow on the basis of the transmission/reception IP address, the transmission/reception TCP port number, or the protocol number, etc., which are included in the received data. Further, the filtering portion 120 determines the amount of data of the same flow inputted to the measuring apparatus per unit time, namely the throughput.

At a step C-3, the filtering portion 120 determines whether or not the received data includes ACK-side information for the same flow. When it is determined that the received data includes ACK-side information, the process of the measuring apparatus 1b returns to the step C-1 where it waits for a next data reception.

When it is determined at the step C-3 that the received data includes SN-side information (namely, the received data does not include ACK-side information), the process of the measuring apparatus proceeds to a step C-4.

At the step C-4, the condition monitoring portion 130b checks the SN of the received data and causes the SN monitoring portion 134b to store the SN. When the same SN has been received multiple times, the condition monitoring portion 130b also records the number of times that it has been received in the SN monitoring portion 134b. Further, when the SN of the current received data is greater than SNs which have been recorded in the SN monitoring portion 134b before the current data reception, the condition monitoring portion 130b updates the value in the maximum-SN monitoring portion 133b.

By referring to the SN monitoring portion 134b at every unit time interval and making a comparison between the minimum SN and the maximum SN recorded within each unit time interval, the amount of data which has reached the user, namely the goodput can be determined.

At a step C-5, the condition monitoring portion 130b determines whether or not the SN of the current received data is a maximum SN. This determination can be achieved by determining whether or not the maximum-SN monitoring portion 134b was updated. If the SN of the current received data is maximum, it can be determined that no packet loss has occurred, and the process of the measuring apparatus 1b returns to the step C-1 where it waits for a next data reception.

Further, at this time, by recording the amount of data when the SN of the current input data is smaller than the value stored in the maximum-SN monitoring portion 134b, the packet loss quantity can be determined.

If it is determined at the step C-5 that the SN of the currently input data is smaller than the value stored in the maximum-SN monitoring portion 134b, the packet-loss determining portion 141b determines, at the step C-6, the position at which data having the same SN was lost during the previous communication. Namely, the packet-loss determining portion 141b determines whether the packet loss occurred between the communication terminal 2 and the measuring apparatus 1 or between the measuring apparatus 1 and the communication terminal 3. Further, the packet-loss determining portion 141b can determine whether the packet loss occurred during communication in the direction of "the communication terminal 2 to the measuring apparatus 1b", "the measuring apparatus 1b to the communication terminal 2", "the measuring apparatus 1b to the communication terminal 3" or "the communication terminal 3 to the measuring apparatus 1b".

At the step C-6, the packet-loss determining portion 141b refers to the SN monitoring table (check list) in the SN monitoring portion 134b.

If the current received data is transmitted from the communication terminal 2 to the communication terminal 3, the packet-loss determining portion 141b executes the following process. When the SN of the current received data exists in the check list, the packet-loss determining portion 141b determines that a packet loss has occurred between the measuring apparatus 1 and the communication terminal 3. Namely, the packet-loss determining portion 141b determines that a packet loss has occurred in the path from the branch device 5, to the communication terminal 3. Then, the packet-loss determining portion 141b executes the process of a step C-7. If the SN of the current received data does not exist in the check list, the packet-loss determining portion 141b determines that a packet loss has occurred between the communication terminal 2 and the measuring apparatus 1. Namely, the packet-loss determining portion 141b determines that a packet loss has occurred in the path from the communication terminal 2 to the branch device 5. Then, the packet-loss determining portion 141b executes the process of a step C-8.

If the received data is transmitted from the communication terminal 3 to the communication terminal 2, the packet-loss determining portion 141b executes the following process. When the SN of the current received data does not exist in the check list, the packet-loss determining portion 141b determines that a packet loss has occurred between the measuring apparatus 1 and the communication terminal 3 and executes the process of the step C-7. If the SN of the current received data exists in the check list, the packet-loss determining portion 141b determines that a packet loss has occurred between the communication terminal 2 and the measuring apparatus 1 and executes the process of the step C-8.

If it is determined at the step C-6 that a packet loss has occurred between the measuring apparatus 1 and the communication terminal 3, the quality determining portion 140b records the amount of current received data in the measuring-apparatus-1/communication-terminal-3 packet-loss recording portion 1432b at the step C-8. Then, the process of the measuring apparatus 1b returns to the step C-1 where it waits for a nest data reception.

If it is determined at the step C-6 that a packet loss has occurred between the measuring apparatus 2 and the communication terminal 1, the quality determining portion 140b records the amount of current received data in the communication-terminal-2/measuring-apparatus-1 packet-loss recording portion 1431b at the step C-8. Then, the process of the measuring apparatus 1b returns to the step C-1 where it waits for a next data reception.

These are the operations of the measuring apparatus 1b according to the second embodiment of the present invention.

As previously described, the technique described in Document 2 attempts to identify the position of occurrence of a packet loss by using three-way, hand-shake scheme of a data-communication establishing process. However, the technique described in Document 2 cannot identify the position of occurrence of a packet loss during normal data communication after data-communication line setting.

On the contrary, according to the second embodiment, the positions of occurrences of packet losses are identified from the changes in SNs and ACK numbers which are generated at all times during communication. Further, according to the second embodiment, SNs and ACK numbers are monitored for communication from the communication terminal 2 to the communication terminal 3 and for communication from the communication terminal 3 to the communication terminal 2, separately (namely, as different flows). Consequently, in the event of the occurrences of packet losses between the communication terminal 2 and the measuring apparatus 1, the second embodiment enables distinguishing between packet losses occurred during communication from the communication terminal 2 to the measuring apparatus 1 and packet losses occurred during communication from the measuring apparatus 1 to the communication terminal 2. This is similarly applied to packet losses occurred between the measuring apparatus 1 and the communication terminal 3.

While the second embodiment has been also described by exemplifying an apparatus for determining the quality of TCP communication for ease of description, the present embodiment is applicable to protocols which offer the order of transmissions of data rows in transmitted data and offer retransmission schemes for addressing data losses, similarly to the first embodiment.

Figure 12:
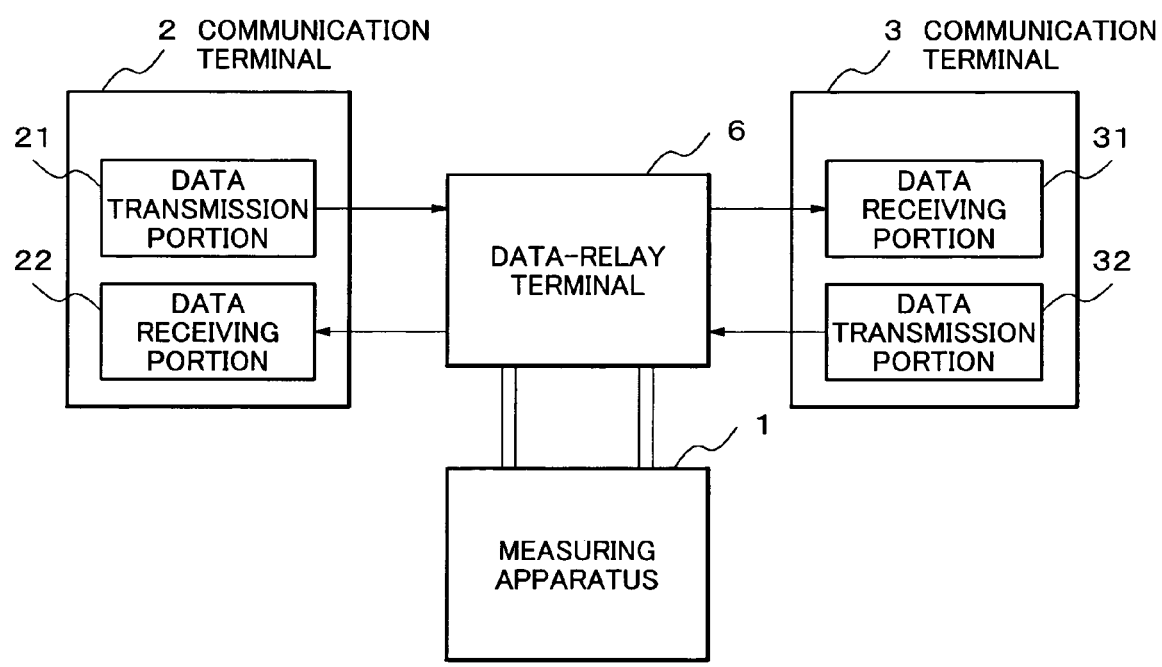
FIG. 12 is a diagram illustrating another exemplary application field of the present invention.

The fields of applications of the present embodiment are not limited to that illustrated in FIG. 1 and the present embodiment is also applicable to the field illustrated in FIG. 12, similarly to the first embodiment.

Third Embodiment

Next, the third embodiment of the present invention will be described.

Figure 15:
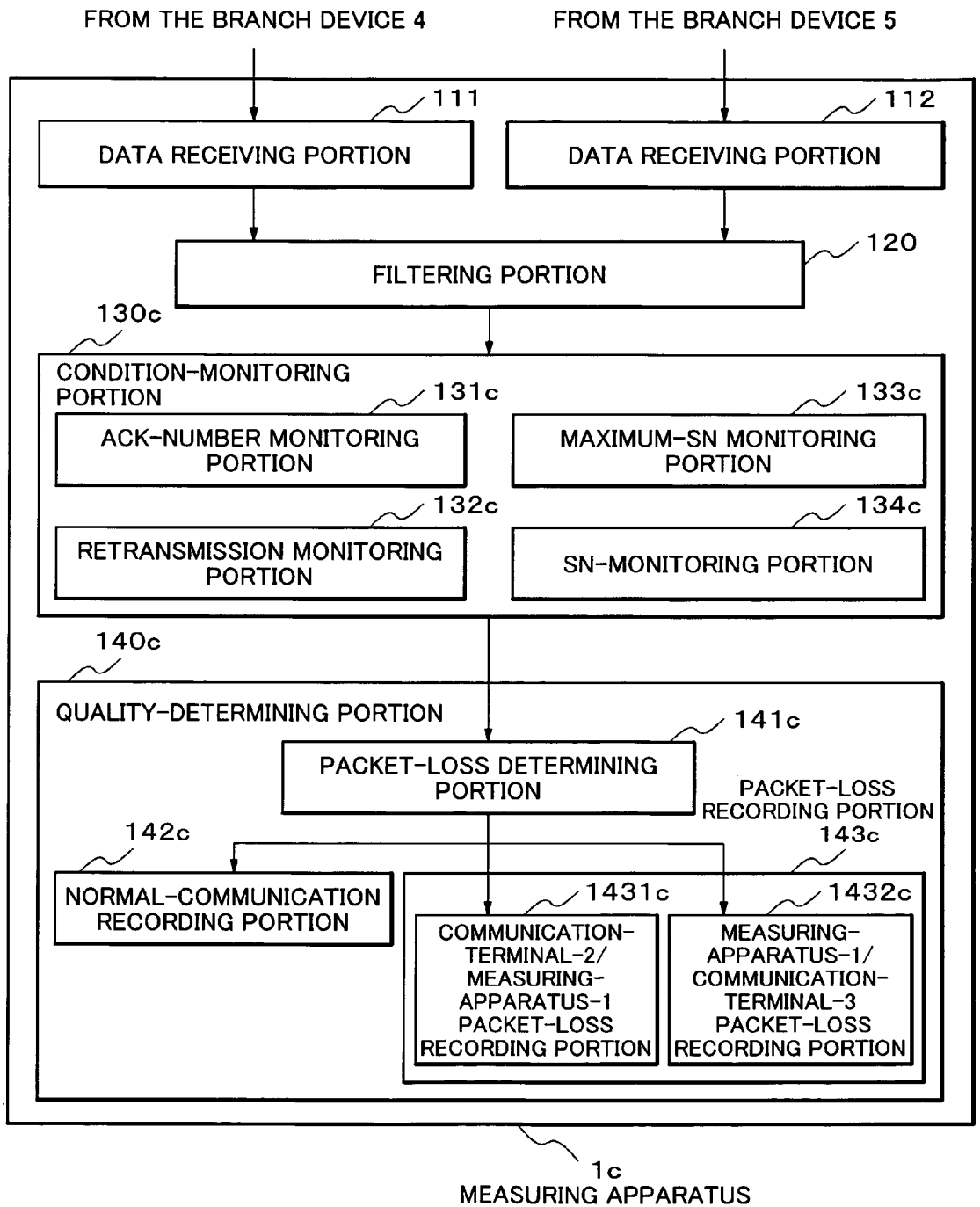
FIG. 15 is a block diagram illustrating the structure of a measuring apparatus according to a third embodiment.

FIG. 15 is a block diagram illustrating the structure of a measuring apparatus 1c according to the third embodiment. Like numerals designate components similar to those of the aforementioned first and second embodiments and duplicated description thereof will be omitted. In the third embodiment, similarly, the measuring apparatus 1c starts processes by capturing data flowing through the network.

As illustrated in FIG. 15, the measuring apparatus 1c according to the third embodiment consists of data receiving portions 111 and 112 for receiving data from branch devices 4 and 5, respectively, a filtering portion 120 for identifying the input data and classifying it by flow, a condition monitoring portion 130 for checking the current condition of the network, and a quality determining portion 140c for detecting the occurrences of packet losses and determining the positions of the occurrences of packet losses.

The data receiving portion 111 receives data from the branch device 4. The data receiving portion 112 receives data from the branch device 5. The data receiving portions 111 and 112 transfer the received data to the filtering portion 120.

The filtering portion 120 identifies the received data and classifies it by flow and then notifies the condition monitoring portion 130c of the results of the identification and classification along with the received data, similarly in the first and second embodiments. Further, the filtering portion 120 determines whether or not the received data includes ACK-side information for the same flow and notifies the condition monitoring portion 130c of the result of the determination, similarly in the first and second embodiments. Subsequently, the condition monitoring portion 130c and the quality determining portion 140c execute their processes for each flow.

The condition monitoring portion 130c monitors the SNs (sequence numbers) in the TCP protocol headers of received data for each flow and the ACK numbers corresponding to the SN numbers received by the receiving terminal, which are included in reception-acknowledgement signals, and extracts various information such as ACK numbers, SNs, etc.

In the quality determining portion 140c, first a packet-loss determining portion 141c determines whether or not a packet loss has occurred while monitoring the state of the condition monitoring portion 130c. If a packet loss has occurred, the packet-loss determining portion 141c identifies the position of the occurrence of the packet loss.

When no packet loss has occurred, the packet-loss determining portion 141c records the amount of received data in the normal-communication recording portion 142c. When a packet loss has occurred, the packet-loss determining portion 141c records the amount of received data the packet-loss recording portion 143c. At this time, on the basis of the result of determination of the position of the occurrence of packet loss, the packet-loss determining portion 141c records the amount of received data in one of the communication-terminal-2/measuring-apparatus-1 packet-loss recording portion 1431c and the measuring-apparatus-1/communication-terminal-3 packet-loss recording portion 1432c.

Next, there will be described processes of the measuring apparatus 1c according to the present embodiment for calculating the throughputs, calculating the goodputs, detecting packet losses and determining the positions of the occurrences of packet losses.

Figure 16:
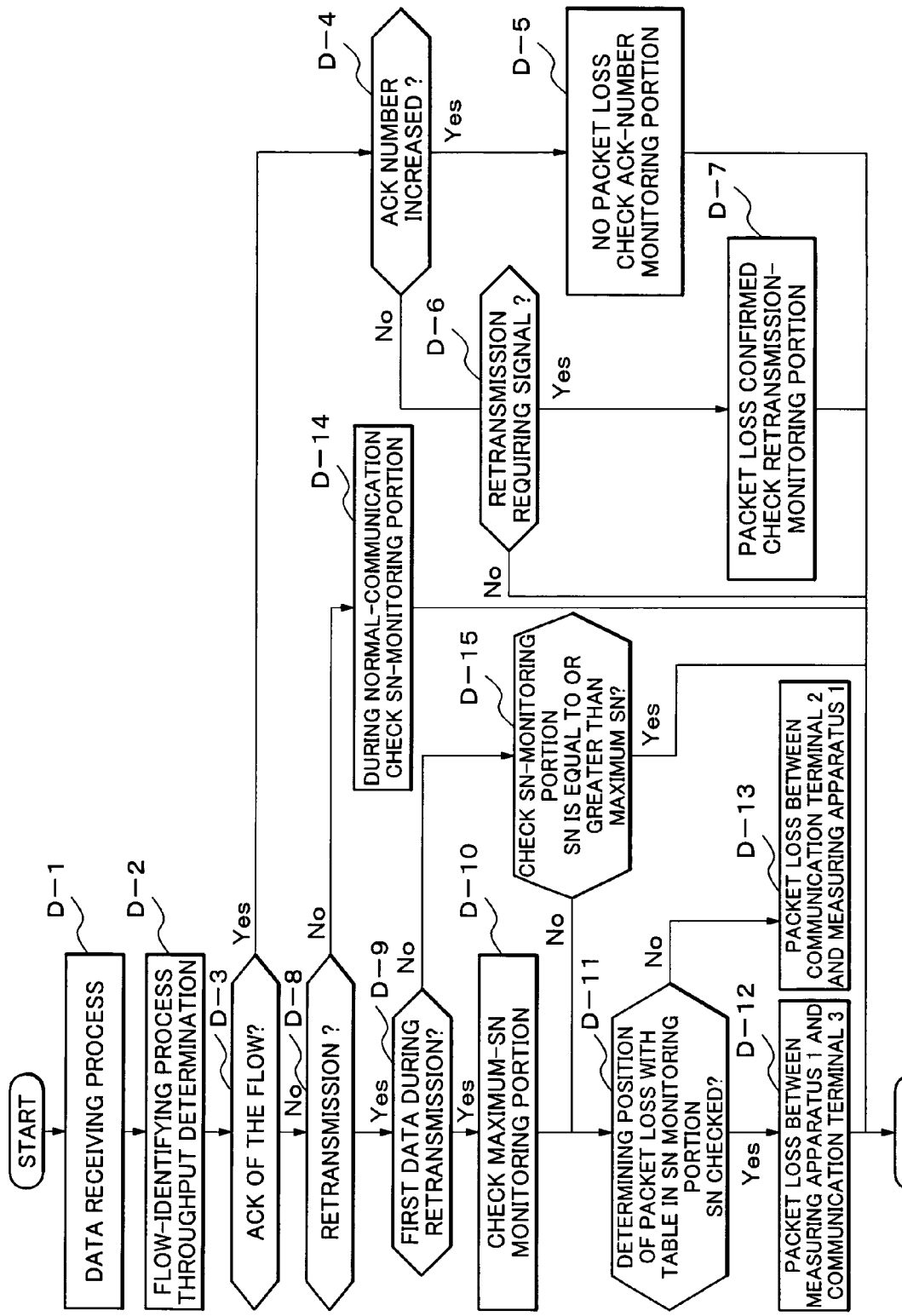
FIG. 16 is a flow chart illustrating a process flow of the measuring apparatus according to the third embodiment.
Figure 17:
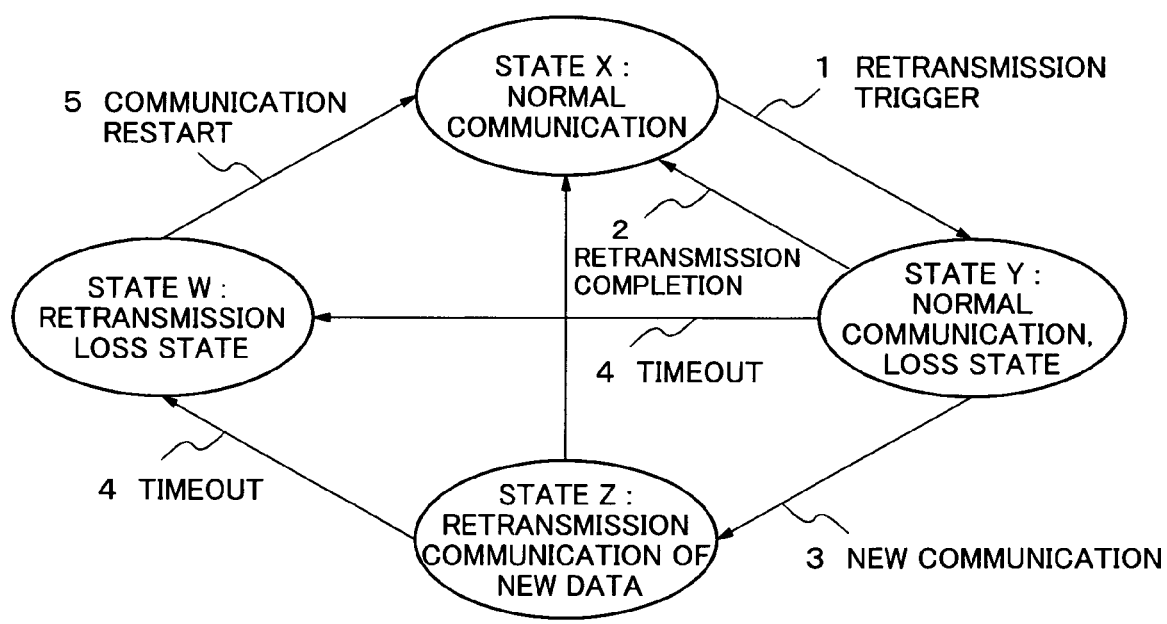
FIG. 17 is a state transition diagram of the measuring apparatus according to the third embodiment.

FIG. 16 is a flow chart describing the processes and the operations of the measuring apparatus 1c. FIG. 17 is a state transition diagram according to the present embodiment.

The measuring apparatus 1c starts the process when data from the branch device 4 is received by the data receiving portion 111 or when data from the branch device 5 is received by the data receiving portion 112 (step D-1).

At a step D-2, the filtering portion 120 identifies the data and classifies it to the flow on the basis of the transmission/reception IP address, the transmission/reception TCP port number and the protocol number, etc., in the received data and monitors the network condition for each flow. Further, the filtering portion 120a can determine the amount of data received per unit time, namely the throughput, for each flow.

At a step D-3, the filtering portion 120 determines whether or not the received data includes ACK-side information for this flow. If it is determined at this time that the received data includes ACK-side information, the process of the measuring apparatus 1c proceeds to a step D-4. If the received data does not include valid ACK-side information, the process of the measuring apparatus 1c shifts to a step D-8.

In TCP communications, single data is formed to be capable of including ACK-side information and SN-side information. In the case of bi-directional communications, in many cases, single data includes ACK-side information data for one of the flows and SN-side information data for the other flow. In such cases, the measuring apparatus treats ACK-side information data and SN-side information data as data for different flows.

At the step D-4, the condition monitoring portion 130c makes a comparison between the ACK number in the received data and the previously-received ACK number stored in the ACK-number monitoring portion 131c to determine whether or not the ACK number of the received data is increased. When the ACK number is increased, the condition monitoring portion 130c registers the ACK number of the current received data in the ACK-number monitoring portion. Then, the process of the condition monitoring portion 130c proceeds to a step D-5. When the ACK number of the received data is equal to the value of the ACK number of the previous reception, the process of the condition monitoring portion 130c proceeds to a step D-6.

Further, by monitoring the condition monitoring portion 130c to determine the amount of increase in the ACK number per unit time, it is possible to determine the amount of data which has been actually received by the receiving terminal within a unit time, namely the goodput.

FIG. 17 illustrates a state transition diagram of the measuring apparatus 1c according to the third embodiment. There are shown, in the state transition diagram, four states which are a state X (where a normal communication is being performed), a state Y (where a normal communication is being performed and there has been a packet loss), a state Z (where retransmission is being performed and new data is being transmitted) and a state W (where retransmission is being performed and there has been a packet loss). When the ACK number is increased, the measuring apparatus 1c is at the state X. Further, even when the measuring apparatus 1c is at the state Y, the state Z or the state W, if the ACK is increased then it returns to the state X.

When it is determined at the step D-4 that the ACK number is increased, no packet loss has occurred and data communications have been successfully achieved. At this time, the condition monitoring portion 130c stores the ACK number of the current received data in the ACK-number monitoring portion 131c (step D-5). Then, the process of the measuring apparatus 1c returns to the step D-1 where it waits for a next data reception.

If it is determined at the step D-4 that the ACK number is not increased, the condition monitoring portion 130c determines, at the step D-6, whether or not the data receiving terminal is requiring data retransmission.

As previously described, for example, in normal TCP communications, in order to achieve such determination, it can be determined whether or not the same ACK number has been received more than twice from the data receiving terminal. Further, when the SACK option is adopted, the data receiving terminal generates a retransmission requirement in which the SN of data required to be retransmitted is written, and the determination as to whether or not the receiving terminal is requiring retransmission may be achieved on the basis of the presence or absence of such a retransmission requirement.

When it is determined at the step D-6 that the data receiving terminal is requiring retransmission, the process of the condition monitoring portion 130c proceeds to a step D-7. Otherwise, the process of the condition monitoring portion 130c returns to the step D-1 where it waits for a next data reception.

At the step D-7, since the data receiving terminal is requiring data retransmission, the measuring apparatus 1c can recognize that a packet loss occurred. At the step D-7, in order to store the fact that the receiving terminal is requiring data retransmission, the condition monitoring portion 130c stores, in the retransmission monitoring portion 132a, the SN number of the data which is currently required to be retransmitted. Then, the process of the measuring apparatus 1c returns to the step D-1 where it waits for a next data reception. At this time, if a retransmission requirement with a new number is generated, it is determined that a retransmission trigger (retransmission requirement) illustrated in the state transition diagram of FIG. 17 is performed, and the transition from the state X to the state Y occurs.

As previously described, when it is determined at the step D3 that the received data does not include an ACK number of the target flow, the process of the measuring apparatus 1c shifts from the step D-3 to the step D-8. At the step D-8, the condition monitoring portion 130c refers to the maximum value in the ACK-number monitoring portion 131c and the maximum value in the retransmission monitoring portion 132c and determines whether or not the data receiving terminal is requiring retransmission. When the maximum value in the ACK-number monitoring portion 131c and the maximum value in the retransmission monitoring portion 132c are equal to each other, the condition monitoring portion. 130c determines that the receiving terminal is requiring retransmission and proceeds to the process of a step D-9. When data is not being retransmitted, the process of the condition monitoring portion 130c proceeds to a step D-14.

In the case where the result of the determination at the step D-8 is "YES", the current state is a state where a packet loss has occurred and data is being retransmitted. This state corresponds to the state Y or the state Z in the state transition diagram of FIG. 17. In this state, at the step D-9, the condition monitoring portion 130c determines whether or not the received data is data which is transmitted from the data transmitting terminal at the first time after the retransmission requirement. Namely, when the SN is decreased first time just after the transition from the state X to the state Y in the state transition diagram of FIG. 17, the received data is determined to be the first data after the retransmission requirement. Even when the measuring apparatus 1c receives a retransmission requirement signal, a time lag will occur until it reaches the data transmitting terminal. Therefore, in order to confirm data retransmission from the data transmitting terminal and check the maximum SN transmitted prior to the occurrence of the packet loss, the process of this step is executed. When the received data is the first data after the retransmission requirement, the process of the condition monitoring portion 130c proceeds to a step D-10. When the received data is not the first data after the retransmission requirement, the process of the condition monitoring portion 130c proceeds to a step D-15.

At the step D-10, the condition monitoring portion 130c checks the SNs of data which have been communicated prior to the occurrence of packet loss and stores the maximum SN out of them, in the maximum-SN monitoring portion 133c. This step D-10 is the process at the state Y in the state transition diagram of FIG. 17.

At the step D11, the packet-loss determining portion 141c determines whether the packet loss occurred during the previous communication between the communication terminal 2 and the measuring apparatus 1 or between the measuring apparatus 1 and the communication terminal 3, namely determines "the position of the occurrence of packet loss".

In the case of a communication from the communication terminal 2 to the communication terminal 3, the packet-loss determining portion 141c refers to an SN monitoring table (namely, a check list) in the SN monitoring portion 134c. If the SN of the current received data exists in the check list, the packet-loss determining portion 141c determines that the packet loss has occurred between the measuring apparatus 1 and the communication terminal 3 and the process of the packet-loss determining portion 141c shifts to a step D-12. When the SN does not exist in the check list, the packet-loss determining portion 141c determines that the packet loss has occurred between the communication terminal 2 and the measuring apparatus 1 and the process of the packet-loss determining portion 141c shifts to a step D-13.

In the case of communication from the communication terminal 3 to the communication terminal 2, similarly, the packet-loss determining portion 141c first refers to the check list in the SN monitoring portion 134c. If the SN of the current received data does not exist in the check list, the packet-loss determining portion 141c determines that the packet loss has occurred between the measuring apparatus 1 and the communication terminal 3 and the process of the packet-loss determining portion 141c shifts to the step D-12. When the SN exists in the check list, the packet-loss determining portion 141c determines that the packet loss has occurred between the communication terminal 2 and the measuring apparatus 1 and the process of the packet-loss determining portion 141c shifts to the step D-13.

At the step D-12, the packet-loss determining portion 141c records the amount of current received data in the measuring-apparatus-1/communication-terminal-3 packet-loss recording portion 1432c. Then, the process of the measuring apparatus 1c returns to the step D-1.

At the step D-13, the packet-loss determining portion 141c records the amount of current received data in the communication-terminal-2/measuring-apparatus-1 packet-loss recording portion 1431c. Then, the process of the measuring apparatus 1c returns to the step D-1.

On the other hand, when it is determined at the step D-8 that the re-transmission is not required, the condition monitoring portion 130c stores the SN of the current received data in the SN monitoring portion 134c at a step D-14. This state corresponds to the state X of the state transition diagram of FIG. 17. At the step D-14, An SN of the received data is recorded.

Then, the process of the measuring apparatus 1c returns to the step D-1.

When it is determined at the step D-9 that retransmission is being required, but the received data is not the first data after the retransmission requirement, the condition monitoring portion 130 makes a comparison between the SN of the received data and the SN values stored in the SN monitoring portion 134c at a step D-15.

The step D-15 is executed when the current received data is data transmitted from the transmitting terminal before the transmitting terminal received the retransmission requirement (namely, when the SN is not decreased after the transition from the state X to the state Y), when data with a greater SN than those transmitted before the occurrence of the packet loss is detected during retransmission and when data with an SN equal to or greater than the SN stored in the maximum-SN monitoring portion 133c is detected.

When it is determined at the step D-15 that the SN of the current received data exceeds the SN in the maximum-SN monitoring portion 133c for the current loss, the condition monitoring portion 130c shifts from the state Y to the state Z in the state transition diagram of FIG. 17 and records the SN of the current received data in the SN monitoring portion 134c. Then, the process of the measuring apparatus 1c returns to the step D-1.

If it is determined at the step D-15 that the SN of the current received data does not exceed the SN in the maximum-SN monitoring portion 133c for the current loss, the process of the measuring apparatus shifts to the previously-described step D-11.

Figure 18:
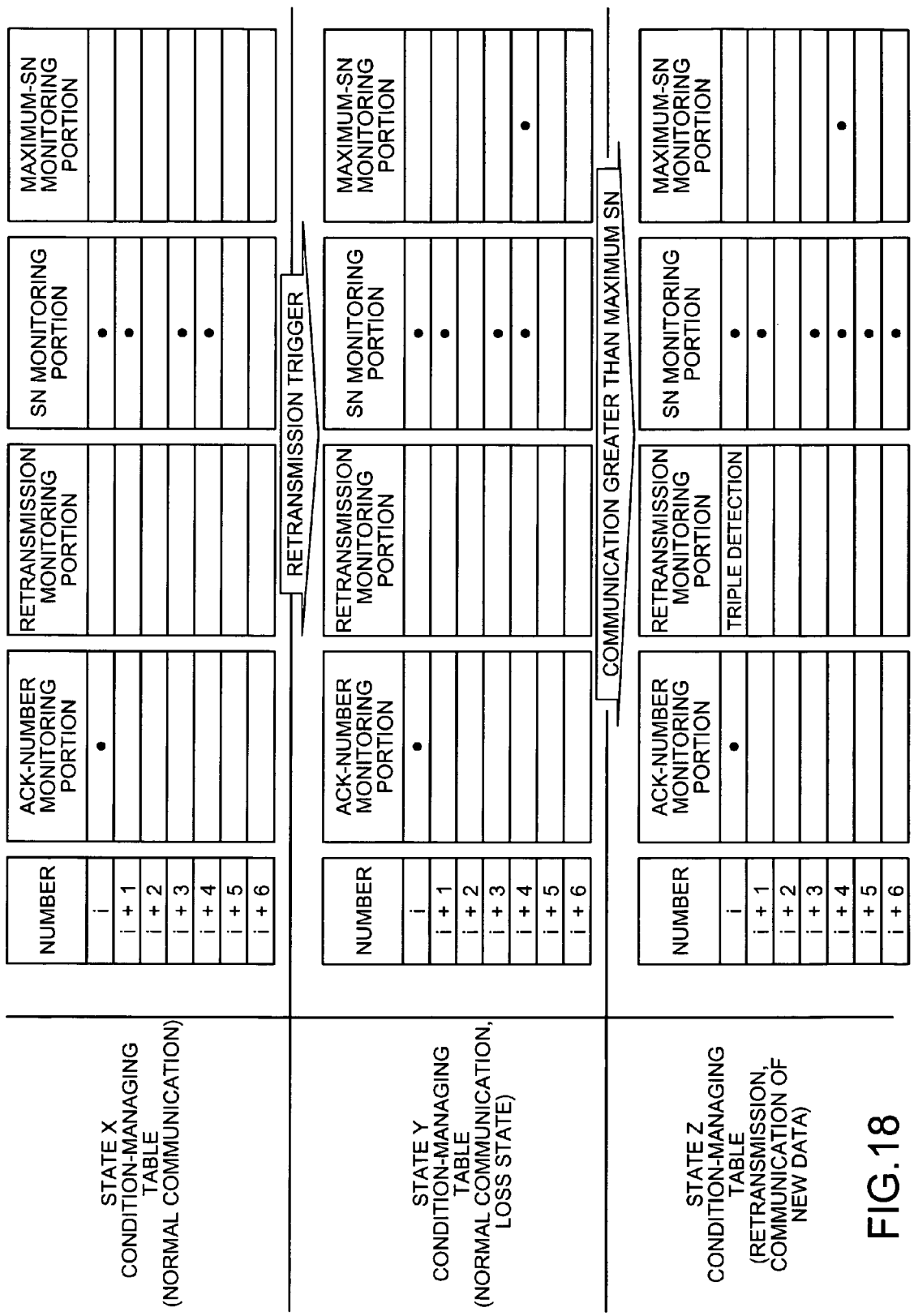
FIG. 18 is a diagram illustrating an exemplary checking method executed at the condition monitoring portion of the measuring apparatus according to the third embodiment.

FIG. 18 illustrates an exemplary relationship between the state transition diagram and the condition monitoring portion 130c according to the present embodiment. At the state X in FIG. 18, the measuring apparatus 1 has received data with SNs of i, (i+1), (i+3) and (i+4) and also has received an ACK number of (i). From this, the measuring apparatus 1 recognizes that the receiving terminal has received data with SNs up to SN (i) When the measuring apparatus 1a receives the ACK number (i) three times, the measuring apparatus 1a shifts to the state Y and this ACK number is registered in the retransmission monitoring portion. When the measuring apparatus receives an SN of (i+5) and an SN of (i+6) at this state, the measuring apparatus shifts to the state Z.

There has been described the operation of the measuring apparatus 1c according to the third embodiment.

As previously described, according to the prior-art technique described in Document 1, when data is received, a comparison is made between the SN of the current received data and the maximum value out of SNs received in the past and, if the SN of the current received data is smaller, the received data is determined to be retransmitted data. Consequently, in the event of disturbance of the order of packets, the measuring apparatus 1 may falsely determine that packet losses have occurred, even when there has been actually no packet loss.

Further, according to the prior-art technique described in Document 2, it is possible to detect the occurrences of packet losses prior to the start of communications during data-circuit connection, but it is difficult to accurately determine the positions of the occurrences of packet losses.

On the contrary, according to the present embodiment, the condition monitoring portion 130c monitors the change of the ACK numbers and, on detecting a retransmission requirement, makes a comparison between the value stored in the ACK number monitoring portion 131c and the value stored in the retransmission monitoring portion 132c. Only when these numbers are equal to each other (when the receiving terminal is requiring retransmission), the condition monitoring portion 130c makes a comparison between the maximum value out of SNs received in the past and the SN of the current received data. Accordingly, even in the event of disturbance of the order of arrivals of packets at the measuring apparatus, the measuring apparatus 1c according to the third embodiment does not determine that packet losses have occurred when the receiving terminal is not requiring retransmission. This can prevent false detection of packet losses due to disturbance of the order of arrival.

Further, with the present embodiment, the position of the occurrence of a packet loss is determined from the variations of SNs and ACK numbers which are generated all the time during communications. This, enables identifying the position of a packet loss anytime when a communication is going on.

The third embodiment has been described by exemplifying the case of determining the quality of TCP communications for ease of description. However, it is apparent that the third embodiment is applicable to all protocols which offer the order of data packets in transmission data and retransmission schemes for addressing data losses. Further, it is applicable to the field of application illustrated in FIG. 12, similarly to the first and second embodiments.

Fourth Embodiment

The fourth embodiment of the present invention will be described.

Figure 19:
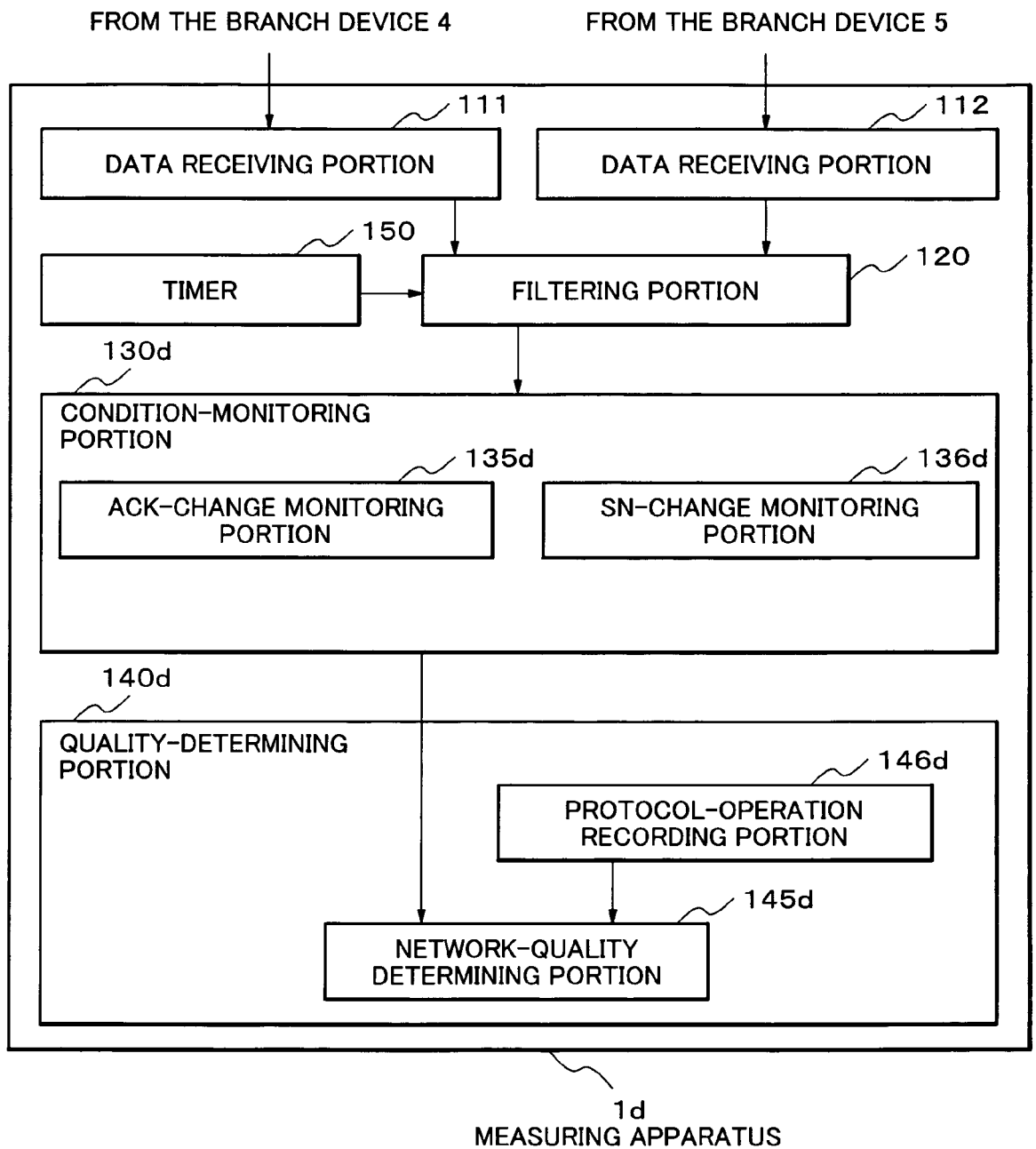
FIG. 19 is a block diagram illustrating the structure of a measuring apparatus according to a fourth embodiment.

FIG. 19 is a block diagram illustrating the structure of a measuring apparatus 1d according to the fourth embodiment of the present invention.

The measuring apparatus 1d according to the fourth embodiment consists of a data receiving portion 111 for receiving data from the branch device 4 in FIG. 1, a data receiving portion 112 for receiving data from the branch device 5 in FIG. 1, a filtering portion 120 for identifying and classifying received data by flow, a timer 150, a condition monitoring portion 130d for checking the current condition of the network, and a quality determining portion 140d.

The data receiving portion 111 receives data from the branch device 4. The data receiving portion 112 receives data from the branch device 5. The data receiving portions 111 and 112 transfer the received data to the filtering portion 120.

On receiving the received data, the filtering portion 120 receives, from a timer 150, the reception time of the received data. Then, on the basis of the transmission/reception IP address, the transmission/reception TCP port number and the protocol number, etc., of the received data, the filtering portion 120 identifies and classifies the received data by flow and notifies the condition monitoring portion 130d of the results of the identification and the classification.

The condition monitoring portion 130d monitors, in the TCP protocol header of the received data, the TCP protocol header of the received data, the data-sequence information (SNs) and the ACK numbers corresponding to the SN numbers which have been received and acknowledged by the receiving terminal for each flow. The ACK-change monitoring portion 135d monitors the change of ACK numbers. The SN-change monitoring portion 136d monitors the change of SNs.

The quality determining portion 140d includes a protocol-operation recording portion 146d for recording the behavior of the protocol operation during communications and a network-quality determining portion 145d for estimating information such as packet losses, the round-trip time, the throughput, etc., on the basis of information from the condition monitoring portion 130d.

Figure 20:
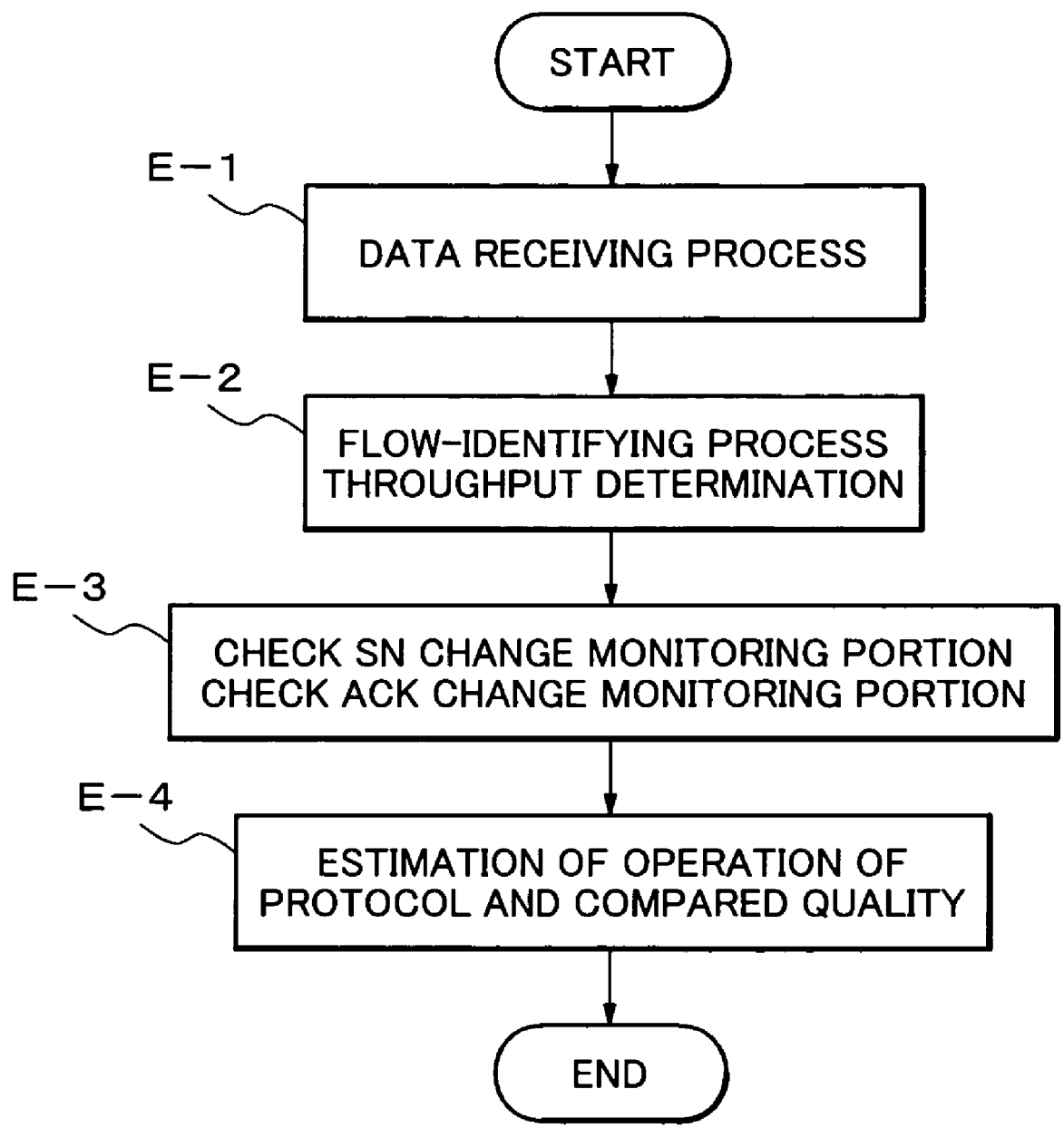
FIG. 20 is a flow chart illustrating a process flow of the measuring apparatus according to the fourth embodiment.

Next, with reference to a flow chart of FIG. 20, a network-quality determining operation of the measuring apparatus 1d will be described.

The measuring apparatus 1d starts processes on receiving data from the data receiving portion 111 or the data receiving portion 112, at a step E-1.

At a step E-2, the filtering portion 120 identifies and classifies the received data by the flow on the basis of the transmission/reception IP address, the transmission/reception TCP port number and the protocol number, etc. of the received data and monitors the condition of each flow. At this time, the filtering portion 120 refers to the value of the timer 150 and records the reception time of the received data. The filtering portion 120 calculates the amount of received data provided to the measuring apparatus 1d per unit time for each flow and thus determines the throughput for each flow. The throughput which is the amount of data of the same flow input to the apparatus is determined (step E-2).

At a step E-3, the condition monitoring portion 130d checks the amount of change of SNs and records it in the SN-change monitoring portion 136d. Further, the condition monitoring portion 130d checks the amount of change of ACKs and records it in the ACK-change monitoring portion 135d.

At a step E-4, the network-quality determining portion 140d checks the quality of the network in the light of the operation of the protocol being in communication, and the operations of the ACK-change monitoring portion 135d and the SN-change monitoring portion 136d.

For example, in the case where the protocol to be determined is TCP, the data transmission terminal increases the communication speed when no packet loss has occurred, while it decreases the communication speed when a packet loss has occurred.

Thus, the network-quality determining portion 140d refers to the operation of the protocol, checks SNs and estimates, when the data communication speed per unit time is increased, that no packet loss has occurred while estimating, when the data communication speed per unit time is decreased, that a packet loss has occurred.

Further, when no packet loss has occurred, the communication speed increases as a function of the round-trip time with the communication partner. By determining the rate of increase of the communication speed, it is possible to estimate the round trip time between the communication terminal 2 and the communication terminal 3.

Further, it is possible to estimate the goodput which is the amount of data which has been actually received by the data receiving terminal, from the amount of increase in the ACK number per unit time and the amount of increase in the SN number per unit time.

There has been described the content of the process of the measuring apparatus according to the fourth embodiment of the present invention.

Although the invention has been described in relation to particular embodiments, it is not thereby limited but on the contrary is susceptible to modifications and variations which will become apparent to one skilled in the art.

What is claimed is:

1. A method for determining the quality of a network by an apparatus connected to said network, said method comprising:
   receiving data being communicated between terminals which belong to said network; and
   determining whether data loss has occurred, comprising:
      deciding whether or not a receiving terminal is at a re-transmission requiring state where it is requiring data retransmission; and
      making a comparison between transmission-sequence-number information of said received data and transmission-sequence-number information of data which has been received up to previous reception;
   wherein, determining whether data loss has occurred further comprises determining that no data loss has occurred:
      when a result of said comparison shows that value of the transmission-sequence-number information of the data which has been received up to the previous reception is greater than a value of the transmission-sequence-number information of said received data, and when the receiving terminal is not at the re-transmission requiring state.

2. The method according to claim 1, wherein deciding whether or not a receiving terminal is at a re-transmission requiring state comprises:
   deciding that the receiving terminal is at said re-transmission requiring state when data with the same reception-acknowledgment information is received predetermined times or more or when data indicating the reception-acknowledgement information which corresponds to the transmission-sequence-number information is not received within a certain time.

3. The method according to claim 1, wherein determining whether data loss has occurred further comprises creating a history of the transmission-sequence-number information of said received data and detecting a data loss or the position of the occurrence of data loss.

4. The method according to claim 3, wherein determining whether data loss has occurred further comprises:
   determining that a data loss has occurred between a measuring apparatus and the receiving terminal when the value of said transmission-sequence-number information is not greater than that of the transmission-sequence-number information of data which has been determined up to the previous reception and also data with said transmission-sequence-number information has been received in the past, and determining that a data loss has occurred between the transmission terminal and the measuring apparatus when said receiving terminal has not received data with said transmission-sequence-number information in the past.

5. The method according to claim 1, further comprising calculating goodput based on an increase in ACK number per unit time of received data indicating reception-acknowledgement information.

6. A method for determining the quality of a network by an apparatus connected to said network, said method comprising:
receiving data being communicated between terminals which belong to said network; and
determining whether a data loss has occurred, comprising:
deciding whether or not a receiving terminal is at a re-transmission requiring state where it is requiring data retransmission;
making a comparison between transmission-sequence-number information of said received data and transmission-sequence-number information of data which has been received up to previous reception;
wherein determining whether a data loss has occurred further comprises determining that a data loss has occurred:
when a result of said comparison shows that value of the transmission-sequence- number information of the data which has been received up to the previous reception is greater than a value of the transmission-sequence-number information of said received data, and
when the receiving terminal is at the re-transmission requiring state.

7. The method according to claim 6, wherein deciding whether or not a receiving terminal is at a re-transmission requiring state comprises:
deciding that the receiving terminal is at said re-transmission requiring state when data with the same reception-acknowledgment information is received predetermined times or more or when data indicating the reception-acknowledgement information which corresponds to the transmission-sequence-number information is not received within a certain time.

8. The method according to claim 6, wherein determining whether a data loss has occurred further comprises creating a history of the transmission-sequence-number information of said received data and detecting a data loss or the position of the occurrence of data loss.

9. The method according to claim 8, wherein determining whether a data loss has occurred further comprises:
determining that a data loss has occurred between a measuring apparatus and the receiving terminal when the value of said transmission-sequence-number information is not greater than that of the transmission-sequence-number information of data which has been determined up to the previous reception and also data with said transmission-sequence-number information has been received in the past, and
determining that a data loss has occurred between the transmission terminal and the measuring apparatus when said receiving terminal has not received data with said transmission- sequence-number information in the past.

10. A method for determining the quality of a network by an apparatus connected to said network, said method comprising:
receiving data being communicated between terminals which belong to said network, including transmission-sequence-number information; and
deciding whether the receiving terminal is at a re-transmission requiring state comprising deciding that the receiving terminal is at said re-transmission requiring state when data with the same reception-acknowledgement information is received predetermined times or more or when data indicating the reception-acknowledgement information which corresponds to the transmission-sequence-number information is not received within a certain time; and
determining the quality of said network on basis of at least two of:
said transmission-sequence-number information indicating one or more data-transmission sequence numbers included in said received data,
the reception-acknowledgment information indicating information about data which has been received by said terminal, and
whether the receiving terminal is at said re-transmission requiring state.

11. A method for determining the quality of a network by an apparatus connected to said network, said method comprising:
receiving data being communicated between terminals which belong to said network; and
determining whether a data loss has occurred, comprising:
deciding whether or not the receiving terminal is at a re-transmission requiring state where it is requiring data retransmission, and
creating a history of a transmission-sequence-number information of said received data,
wherein determining whether a data loss has occurred comprises determining that a data loss has occurred between a measuring apparatus and the receiving terminal:
when value of said transmission-sequence-number information is not greater than that of transmission-sequence-number information of data which has been determined up to previous reception and
when data with said transmission-sequence-number information exists in said history, and
wherein determining whether a data loss has occurred comprises determining that a data loss has occurred between the transmission terminal and the measuring apparatus:
when data with said transmission-sequence-number information does not exist in said history.

12. An apparatus for determining the quality of a network comprising:
receiving means for receiving data being communicated between terminals which belong to said network; and
determining means for determining whether a data loss has occurred, comprising:
deciding means for deciding whether or not the receiving terminal is at a re-transmission requiring state where it is requiring data retransmission, and
comparison means for comparing a value of transmission-sequence-number information of said received data and transmission-sequence-number information of data which has been received up to a previous reception, wherein
the determining means determines that no data loss has occurred:
when the value of the transmission-sequence-number information of said received data is not greater than that of transmission-sequence-number information of data which has been received up to previous reception, and
when the receiving terminal is not at the re-transmission requiring state.

13. The apparatus according to claim 12, wherein said deciding means decides that the receiving terminal is at said re-transmission requiring state when data with the same reception-acknowledgment information is received predetermined times or more by said receiving means or when data indicating the reception-acknowledgment information which corresponds to the transmission-sequence-number information is not received within a certain time by said receiving means.

14. The apparatus according to claim 12, wherein said determining means creates a history of the transmission-sequence-number information of said received data and detects a data loss or the position of the occurrence of data loss.

15. The apparatus according to claim 14, wherein said determining means determines that a data loss has occurred between a measuring apparatus and the receiving terminal:
when the value of said transmission-sequence-number information is not greater than that of the transmission-sequence-number information of data which has been determined up to the previous reception and data with said transmission-sequence-number information has been received in the past, and
said determining means determines that a data loss has occurred between the transmission terminal and the measuring apparatus:
when said receiving means has not received data with said transmission-sequence-number information in the past.

16. An apparatus for determining the quality of a network comprising:
receiving means for receiving data being communicated between terminals which belong to said network; and
determining means for determining whether a data loss has occurred, comprising:
deciding means for deciding whether or not the receiving terminal is at a re-transmission requiring state where it is requiring data retransmission, and
comparison means for comparing a value of transmission-sequence-number information of said received data and transmission-sequence-number information of data which has been received up to a previous reception;
wherein the determining means determines that a data loss has occurred when:
the value of transmission-sequence-number information of said received data is not greater that of transmission-sequence-number information of data which has been received up to previous reception, and
when the receiving terminal is at the re-transmission requiring state.

17. The apparatus according to claim 16, wherein said deciding means decides that the receiving terminal is at said re-transmission requiring state when:
data with the same reception-acknowledgment information is received predetermined times or more by said receiving means or
when data indicating the reception-acknowledgment information which corresponds to the transmission-sequence-number information is not received within a certain time by said receiving means.

18. The apparatus according to claim 16, wherein said determining means creates a history of the transmission-sequence-number information of said received data and detects a data loss or the position of the occurrence of data loss.

19. The apparatus according to claim 18, wherein said determining means determines that a data loss has occurred between a measuring apparatus and the receiving terminal when:
the value of said transmission-sequence-number information is not greater than that of the transmission-sequence-number information of data which has been determined up to the previous reception, and
data with said transmission-sequence-number information has been received in the past, and
said determining means determines that a data loss has occurred between the transmission terminal and the measuring apparatus when:
said receiving means has not received data with said transmission-sequence- number information in the past.

20. An apparatus for determining quality of a network comprising:
receiving means for receiving data being communicated between terminals which belong to said network, including transmission-sequence-number information; and
deciding means for deciding whether the receiving terminal is at a re-transmission requiring state comprising deciding that the receiving terminal is at said re-transmission requiring state when data with the same reception-acknowledgement information is received predetermined times or more by said receiving means or when data indicating the reception-acknowledgement information which corresponds to the transmission-sequence-number information is not received within a certain time by said receiving means; and
determining means for determining the quality of said network on basis of at least two of:
said transmission-sequence-number information indicating one or more data transmission sequence numbers included in said received data,
the reception-acknowledgment information indicating information about data which has been received by said terminal, and
whether the receiving terminal is at said re-transmission requiring state.

21. An apparatus for determining the quality of a network comprising:
receiving means for receiving data being communicated between terminals which belong to said network; and
determining means for determining whether a data loss has occurred, comprising:
deciding means for deciding whether or not the receiving terminal is at a re-transmission requiring state where it is requiring data retransmission; and
means for creating a history of a transmission-sequence-number information of said received data, and
said determining means determines that a data loss has occurred between a measuring apparatus and the receiving terminal when:
value of said transmission-sequence-number information is not greater than that of transmission-sequence-number information of data which has been determined up to previous reception, and
when data with said transmission-sequence-number information exists in said history, and
said determining means determines that the data loss has occurred between the transmission terminal and the measuring apparatus:
when data with said transmission-sequence-number information does not exist in said history.

* * * * *